US007952035B2

(12) United States Patent
Falk et al.

(10) Patent No.: US 7,952,035 B2
(45) Date of Patent: May 31, 2011

(54) CONDUCTOR LEADTHROUGH, HOUSING DEVICE, FIELD APPARATUS AND METHOD FOR PRODUCING A CONDUCTOR LEADTHROUGH

(75) Inventors: Johannes Falk, St. Georgen (DE); Daniel Schultheiss, Hornberg (DE); Juergen Motzer, Gengenbach (DE)

(73) Assignee: Vega Grieshaber KG, Wolfach (DE)

( * ) Notice: Subject to any disclaimer, the term of this patent is extended or adjusted under 35 U.S.C. 154(b) by 150 days.

(21) Appl. No.: 12/372,543

(22) Filed: Feb. 17, 2009

(65) Prior Publication Data

US 2009/0211808 A1 Aug. 27, 2009

Related U.S. Application Data

(60) Provisional application No. 61/030,028, filed on Feb. 20, 2008.

(30) Foreign Application Priority Data

Feb. 20, 2008 (EP) .................................... 08101804

(51) Int. Cl.
*H02G 3/18* (2006.01)

(52) U.S. Cl. ........ 174/667; 174/650; 174/658; 174/662; 439/78

(58) Field of Classification Search .............. 174/11 BH, 174/18, 22 R, 151, 152 R, 650, 658, 662, 174/168, 23 R; 439/322, 78
See application file for complete search history.

(56) References Cited

U.S. PATENT DOCUMENTS

| | | | | |
|---|---|---|---|---|
| 5,220,132 A * | 6/1993 | Macey | .......................... | 174/658 |
| 7,193,156 B2 * | 3/2007 | Alznauer et al. | .......... | 174/152 R |
| 2004/0038587 A1 | 2/2004 | Yeung et al. | | |
| 2005/0186823 A1 | 8/2005 | Ring et al. | | |

* cited by examiner

*Primary Examiner* — Dhiru R Patel
(74) *Attorney, Agent, or Firm* — Fay Kaplun & Marcin, LLP

(57) ABSTRACT

A conductor leadthrough for a field device is for connecting two electrical conductors. The conductor leadthrough comprises an external conductor and a sealing apparatus. The sealing apparatus is divided into a first separation device and a second separation device. The external conductor comprises a hollow internal region that extends along a longitudinal axis of the external conductor. The first separation device and the second separation device are arranged along the longitudinal axis of the external conductor so as to be spaced apart so that they can separate a section of the hollow internal region of the external conductor. A pourable-sealing device is filled into the separated section of the hollow internal region of the external conductor so that the sealing apparatus can provide a leakage rate whose value is below a predeterminable value of a leakage rate. A signal of a predeterminable frequency can be transmitted along the longitudinal axis.

26 Claims, 8 Drawing Sheets

CONDUCTOR LEADTHROUGH, HOUSING DEVICE, FIELD APPARATUS AND METHOD FOR PRODUCING A CONDUCTOR LEADTHROUGH

PRIORITY CLAIM

This application claims the benefit of the filing date of U.S. Provisional Patent Application Ser. No. 61/030,028 filed 20 Feb. 2008 and EP Patent Application Serial No. EP 08 101 804 filed 20 Feb. 2008; the disclosure of these applications is hereby incorporated herein by reference.

FIELD OF INVENTION

The present invention relates to the field of measuring technology. In particular, the present invention relates to a conductor leadthrough, a housing apparatus, a field device and a method for producing a conductor leadthrough.

BACKGROUND INFORMATION

Field devices, in particular field devices which are utilized with sensors for measuring fill levels, limit levels and pressures, are often based on transit time measuring or run time measuring. In transit time measuring, the signal transit times or signal run times of radar pulses or of guided microwave pulses are determined. From these signal transit times the desired measured variable or measured value is determined.

Radar pulses are radar signals of a particular frequency and duration. The radar signals and the microwave signals belong to the field of high-frequency (HF) technology. Therein, as signals that are laying in the range of high-frequency technology, signals in the frequency range of up to 2 GHz are used as guided microwave signals, and signals in the range from 5 GHz-7 GHz and from 24 GHz to 28 GHz are used as radar signals.

The term conductor leadthrough is intended to refer to a connecting apparatus for connecting two conductors. A conductor can be an electrical conductor such as a cable, a coaxial line or coaxial conductor, a hollow conductor, a strip conductor or some other device that is suitable for transmitting signals on a desired path between two locations.

The measuring probes, in particular radar antennas and microwave probes respectively, often need to operate under harsh environmental conditions. In the chemical industry it can happen, for example, that fill levels of explosive materials have to be measured in containers.

For the purpose of carrying out measuring in such dangerous environments, sealed plug-type connections, in particular sealed-off coaxial HF plug-type connections, and conductor leadthroughs respectively are used, which prevent the electronics of the measuring devices, field devices and evaluation devices respectively from establishing contact with the explosive substances.

The region in which the feed material is located is distinct from the region in which the measuring electronic is located. The two regions constitute separate zones.

In the use of a fill level sensor, conductor leadthroughs or leadthroughs between the zones may be necessary, which conductor leadthroughs or leadthroughs, while letting electrical signals pass, nevertheless maintain the zone separation. A sealed-off conductor leadthrough can maintain zone separation.

For sealing-off line leadthroughs or conductor leadthroughs, glass leadthroughs or ceramics leadthroughs are employed. Due to their production costs, these leadthrough solutions on a glass base or on a ceramics base are, however, cost-intensive solutions.

There may be a need for a simpler solution for a conductor leadthrough.

SUMMARY OF INVENTION

The present invention relates to a conductor leadthrough, a housing apparatus, a field device and a method for producing a leadthrough are provided.

According to an aspect of the present invention, a conductor leadthrough, in particular an HF plug-type connection for a field device or a measuring device, is created for collecting two electrical conductors. The conductors may be HF conductors, for example strip conductors, coaxial conductors, hollow conductors or the like.

The conductor leadthrough comprises an external conductor and a sealing apparatus. The sealing apparatus in turn comprises at least one first separation device and a pourable-sealing device. The external conductor comprises a hollow internal region, which hollow internal region extends along a longitudinal axis of the external conductor.

The at least one first separation device is arranged along the longitudinal axis of the external conductor so that the at least one first separation device divides the hollow internal region of the external conductor into at least two sections.

In at least one of the two sections of the hollow internal region of the external conductor the pourable-sealing device is arranged so that the pourable-sealing device rests against the at least one separation device, and thus the sealing apparatus along the longitudinal axis of the hollow internal region of the external conductor comprises a leakage rate whose value is below a predeterminable value of a leakage rate. Thus it may, for example, be possible to produce a vacuum seal. Furthermore, the at least one separation device may be arranged in the internal region so that the separation device essentially prevents a spread of the pourable-sealing device along the longitudinal axis. For example, the at least one first separation device may be arranged so as to be perpendicular to the longitudinal axis.

An electrical signal having a predeterminable frequency can be transmitted along the longitudinal axis of the external conductor. The attenuation of the signal along the longitudinal axis may be essentially constant during the transmission.

According to another aspect of the present invention, a housing apparatus is created which comprises a connection space region, an electronics space region and a housing separation device. Furthermore, the housing apparatus comprises the conductor leadthrough according to the invention, wherein the housing separation device separates the connection space region and the electronics space region from another. The conductor leadthrough is arranged in the housing separation device so that an electrical signal exchange and/or an electrical power exchange between the connection space region and the electronics space region are/is enabled. In particular, a signal exchange between a probe or a sensor that is connected in the connection region or in the connection space region, and evaluation electronics that are arranged in the electronics region or in the electronics space region can be made possible.

In this arrangement the conductor leadthrough is arranged in the housing separation device so that a connection between the connection region and the electronics region can be sealed off, by means of the sealing apparatus, at a predeterminable leakage rate. The value of the leakage rate is below a predeterminable value of a leakage rate, or corresponds to the predeterminable value of the leakage rate.

Sealing may essentially suppress any material exchange, gas exchange or fluid exchange between the connection space region and the electronics space region.

Generally speaking, by means of the sealing apparatus the material exchange between a first spatial region, i.e. the connection space region, and a second spatial region, i.e. the electronics space region, may be reducible to a predeterminable extent. In other words, this may mean that by means of the sealing apparatus it is possible to determine the leakage rate or the helium leakage rate that exists between two space regions. The leakage rate may be measured in the unit mbar $$\frac{l}{\sec}.$$

According to yet another exemplary embodiment of the present invention, a field device is created that comprises the conductor leadthrough and/or the housing apparatus.

According to yet another aspect of the present invention, a method for producing a conductor leadthrough is stated, wherein the method involves the provision of an external conductor. The external conductor comprises a hollow internal region into which at least one first separation device is inserted. The at least one first separation device is inserted into the hollow internal region of the external conductor so that the hollow internal region of the external conductor is divided into at least two sections. At least one of the divided or separated at least two sections of the hollow internal region is at least partly filled-in with a pourable-sealing device.

Filling-in the pourable-sealing device takes place so that the pourable-scaling device comes to rest against the at least one first separation device, and so that the at least one first separation device and the pourable-sealing device form a sealing apparatus. Along the longitudinal axis of the hollow internal region of the external conductor the sealing device, which comprises the separation device and the pourable-sealing apparatus, comprises a leakage rate whose value is below a predeterminable value of a leakage rate.

An electrical signal of a predeterminable frequency can be transmitted along the longitudinal axis of the external conductor by means of the conductor leadthrough.

For the purpose of filling, a filling needle can be used, which at a suitable position is guided through the cladding or lateral surface of the external conductor into the hollow internal region. However, gravitational force may also be used for filling, in that the pourable-sealing device is filled in a cup-shaped manner into the separated section.

The use of a glass leadthrough or ceramics leadthrough, i.e. the use of a corresponding material for sealing off two spatial regions, may provide a leakage rate or a helium leakage rate of approximately $1\times10^{-9}$ mbar $$\frac{l}{\sec}.$$

However, the use of melted-in glass in the internal region of an external conductor may make it necessary to use an internal soldering bush. Providing a glass leadthrough or a coaxial glass leadthrough may necessitate a combination of various special materials. These materials may have to be matched to each other so that a permanent leadthrough can be produced from these materials. The use of glass may thus make it necessary for expensive special materials or specially matched materials to be used.

In the case of a glass leadthrough it may, for example, be necessary to produce an internal conductor and the soldering bush of the external conductor from a material providing controlled thermal expansion or from a material with a matched coefficient of expansion in order to prevent different expansion of the melted-glass and of the soldering bush. Such a material with matching coefficients of expansion is, for example, marketed by the company VACUUMSCHMELZE GmbH & Co. KG, Hanau, under the trademark of VACON®. In particular, the material with material number 1.3981 may comprise a correspondingly adjusted coefficient of expansion. Hereinafter, VACON® with the material number 1.3981 is also referred to as 1.3981.

By means of the soldering bush, sealing off the coaxial glass leadthrough from the external conductor may take place. 1.3981 may have a coefficient of expansion that is similar to, or adjusted to, that of the melted-in glass. In other words, with the use of this special material made of melted-in glass and 1.3981, an adjusted glass leadthrough may be implementable.

The matched or adjusted glass leadthrough may prevent adhesion between the glass leadthrough and the soldering bush of the external conductor from being lost or torn-off during changes in temperature.

Zone separation by means of such a coaxial glass leadthrough, i.e. a leadthrough that comprises glass for sealing purposes, may be approved for high-pressure applications. However, the expenditure for providing and for producing the adjusted glass leadthrough may be high.

Generally speaking, in the production of a coaxial plug-type connection or in the production of a coaxial conductor leadthrough or a leadthrough it may be necessary to ensure that there are as few butt joints as possible in the corresponding plug-type connection that has been implemented by means of the conductor leadthrough. This means that points of discontinuity, discontinuous material changeovers or geometry changeovers in the conductor leadthrough may have to be avoided. In particular, discontinuous changeovers within the components of a conductor leadthrough, for example within the external conductor, the internal conductor or the sealing apparatus, may have to be avoided. Every butt joint or every discontinuity may result in impedance steps in the conductor leadthrough. In particular if a conductor leadthrough is used in the HF range, discontinuities may have an effect on the electrical transmission characteristics or on the propagation of electrical signals.

However, since for the purpose of sealing the conductor leadthrough a material may be used that comprises such a discontinuity in particular in the form of a relative dielectric constant $\in_r$, which relative dielectric constant may differ from the relative dielectric constant of an adjacent material, for the purpose of equalising the discontinuity it may be necessary to adapt conductor diameters. For example, where an external conductor and an internal conductor are used it may be necessary to adapt the diameters of the conductors to each other. In the case of coaxial conductors the ratio of the external diameter of the internal conductor to the internal diameter of the external conductor may be determined according to the equation $$\frac{60\Omega}{\sqrt{\varepsilon_r}}\cdot\ln\left(\frac{\text{Internal diameter of the external conductor}}{\text{External diameter of the internal conductor}}\right)$$

This equation may essentially determine the wave impedance of a coaxial line or of the coaxial conductor leadthrough.

Provided the wave impedance along the longitudinal axis of the external conductor is to be constantly 50Ω, as a result of the insertion of the separation devices and the pourable-sealing device into the hollow internal region of the external conductor, the ratio of the internal diameter of the external conductor to the external diameter of the internal conductor may be determinable.

A first separation device and/or a second separation device may be an auxiliary means that may make it possible for the pourable-sealing device to be held in the desired position during arrangement of the pourable-sealing device in the separated section. For example, when arranged or injected into the separated section, the pourable-sealing device may be liquid, and it may harden only after injection.

With the use of special materials in the construction of a glass leadthrough, the production of a glass leadthrough maybe associated with very considerable effort and expenditure. Furthermore, it may be necessary for a glass leadthrough to have to be soldered into the external conductor of the coaxial connector, plug or the coaxial plug-type connection by means of soldering bushes in order to provide a necessary extent for sealing. The soldering process by means of which soldering-in is carried out may also be very expensive and complicated and may render production more difficult.

In order to contact the internal conductor and in order to coaxially forward an HF signal, a spring contact may be required on both sides of the internal conductor. In other words, if the plug-type connection or the conductor leadthrough is to interconnect two conductors, the use of slotted internal conductors may be required for contacting the corresponding conductors. In order to produce the spring contacts it may, furthermore, be necessary to make a slot in the internal conductor once or twice. However, the production of slotted internal conductors may be very expensive.

In order to preserve the spring characteristics of the spring element it may be necessary to harden the spring contacts. The plug-type connection may, for example, be equipped using SMD (surface mounted device) technique, wherein the plug-type connections have to be soldered in the reflow furnace. During soldering in a reflow furnace the material may be subjected for an extended period of time, for example 40 seconds, to a temperature of, for example, 260° C. In this process it may be unavoidable for the hardened spring contacts, during this period of time, to also be subjected to the high temperature of 260° C. However, if the spring contacts are subjected to the high temperature for such an extended period of time, this may result in the plugged-in contacts yielding, i.e. losing their hardness.

The spring contacts of the internal conductors can be made from CuBe (copper-beryllium). However, the relaxation strength of spring contacts made from CuBe may yield under the influence of the high temperature over an extended period of time. Soldering may thus jeopardise reliable long-term contacting in the case of internal-conductor constructions that have been built separately.

By means of a conductor leadthrough that comprises a sealing apparatus according to the present invention, a robust construction may be able to be produced. In this process the use of the pourable-sealing device, and in particular of the pourable-sealing system, i.e. the combination of the first separation device and/or of the second separation device with the pourable-sealing device, may ensure an improved sealing effect. The discontinuities in material characteristics, which discontinuities arising in the construction of the sealing apparatus, may be evened out by mutual matching of the internal diameters and/or of the external diameters of the conductor leadthrough.

With the use of this pourable-sealing system or the pourable-sealing apparatus, a sealing effect or a leakage rate or helium leakage rate of approximately $1\times10^{-7}$ mbar $$\frac{l}{\sec}$$

may be achievable. This value may exceed the requirements for zone separation according to that stated in the European standard EN 60079-26:2004, i.e. below a predeterminable value. The standard may prescribe a leakage rate of $1\times10^{-4}$ mbar $$\frac{l}{\sec}.$$

The pourable-sealing system may, furthermore, be used as a gas seal according to the European standard EN 60079-11. Moreover, a gas exchange above a predeterminable lower leakage rate may be prevented. The pourable-sealing system may prevent a potentially explosive gas from ingressing to a hazardous extent into a space with an electric circuit that is not intrinsically safe, or into a space comprising circuit components that are not intrinsically safe.

In other words, this means that in order to measure potentially explosive gases in a container it may be necessary to place a probe, in particular a measuring probe, in direct contact with the potentially explosive gases. The measuring probe may furnish measured values in the form of raw data, which data requires further processing by means of evaluation electronics. A field device may, for example, comprise such a measuring probe. The measured values may be transmittable by way of the conductor leadthrough, while the gases are to be prevented from escaping from the container.

The evaluation electronics may be implemented as an electric circuit that is not intrinsically safe. This means that during construction of the electric circuit, there may not, for example, have been any attention paid to electrically separating current input ports and current output ports from each other. In an intrinsically safe electric circuit care may have been taken to prevent any spark from arising, which spark could cause a gas mixture to explode.

However, since it may not be necessary to forward the raw data from the measuring probe to the evaluation electronics it may be sensible to install a seal or a zone separation between the evaluation circuit and the potentially explosive gas. In other words, between the zones a seal may be used that essentially stops the flow of material or the gas exchange between the zones. To this effect the seal may comprise a low leakage rate. This means that the through-flow of material through the seal in the direction of an electric current that is not intrinsically safe or in the direction of an electric circuit that is not explosion-proof may be below a certain predetermined rate. A field device that comprises a corresponding zone separation device may be approved for corresponding potentially explosive environments.

A sealing apparatus with a correspondingly low leakage rate or with a leakage rate below a predetermined threshold of a leakage rate, or below a predetermined value of a leakage rate, may ensure that the regulations are observed. In a single-part construction the internal conductor of a coaxial line system or of a conductor leadthrough may be slotted and hardened only on one side. Guiding the internal conductor may be implemented by way of plastic supports, in particular by way of plastic supports made of PTFE or PEEK.

PEEK (polyetheretherketone) may be a partially crystalline thermoplastic that can be used where mechanical loads are to be absorbed even at a high temperature.

PTFE (polytetrafluoroethylene) as a separation device, due to its chemical inertness, may be used wherever aggressive chemicals are present. Due to its lasting properties, PTFE may be used in industrial applications and may also be suitable as a separation device.

The use of the sealing apparatus according to the invention, comprising at least one first separation device, a second separation device and a pourable-sealing device, may avoid the need for an expensive soldering location on the external conductor of a glass leadthrough. Furthermore, the sealing apparatus may make additional contacting of the internal conductor superfluous.

In other words it may be an idea of the present invention to create a simply designed sealing apparatus that makes possible a leakage rate that is below a predeterminable maximum leakage rate. While material transport through the sealing apparatus, and in particular through the conductor leadthrough, may essentially be prevented, the transport of electrical signals, electrical energy and in particular of measured values may be able to be implementable by way of the conductor leadthrough from one space region to the other space region with as little loss as possible.

Electrical conductors may comprise two lines. Conducting electrical signals may require contact of the lines. In order to prevent any exchange of material, physical zone separation may be desirable in order to prevent a potentially explosive gas from getting near an electric circuit that is not intrinsically safe, or from getting, to a dangerous extent, near an electric circuit that is not intrinsically safe. Thus two conflicting principles may be encountered. On the one hand it may be desirable to make possible good conductivity by means of direct contact of the conductors of the two zones, while on the other hand it may also be desirable to separate the zones from each other to the best possible extent. Consequently, it may be sensible to create a sealing arrangement that comprises the sealing apparatus and the lines, wherein the sealing apparatus conforms to the lines to the best possible extent.

By means of such a sealed line or conductor leadthrough it may be possible to transmit raw data from measured data to an evaluation device, essentially without any material or hazardous substance escaping or diffusing-through from one region to the other.

Filling a hollow conductor section by means of a pourable-sealing device or a dielectric may, on the one hand, enable electrical insulation by means of the corresponding separation device vis-à-vis an external conductor. On the other hand the pourable-sealing device may seal off gaps that arise between a separation device and the external conductor, in which external conductor the liquid pourable-sealing device may flow, or may be pushed, into existing gaps. By means of the filled-in pourable-sealing device it may be possible to prevent a contact between a separation device and the external conductor of a conductor leadthrough from cutting-off or failing.

A coaxial line or a hollow conductor may comprise a hollow internal region. This hollow internal region may make it possible for hazardous substances or materials to get from one space region to another space region. In this arrangement the hollow conductor may act like a tube. It may therefore be necessary to seal off the hollow internal region or the essentially hollow internal region of a corresponding conductor. However, the action of sealing-off should have the least possible influence on the electrical characteristics of the hollow conductor. It may thus be an idea to use a dielectric or an electric insulator of an electrical conductor for sealing-off or insulating a material flow. Despite sealing the hollow space off from a material flow, electrical conductivity should essentially be maintained.

Epoxy resin or silicone, for example a single-component pourable-sealing system, a two-component pourable-sealing system or a UV-curing pourable-sealing system may be used as a pourable-sealing device. Such materials may provide sufficient elasticity to closely conform to the external conductor or to the internal conductor even at different temperatures or in fluctuating temperatures. Such close conforming may prevent any flow-through of materials in the interior of the external conductor along the longitudinal axis of the external conductor. As a result of the close conforming, any flow-through of materials between the pourable-sealing device and the external conductor, or between the pourable-sealing device and the internal conductor, may be prevented or at least limited to a predeterminable extent.

By means of the at least one first separation device and/or the second separation device the viscous or elastic pourable-sealing device may be held at a predetermined location. A corresponding sealing apparatus comprising a pourable-sealing device, a first separation device and/or a second separation device may meet the requirements of proof of adhesion or proof of bonding so that a corresponding conductor leadthrough can be used, i.e. has been approved for use, in a potentially explosive environment.

The first separation device and the second separation device may hold the pourable-sealing device at the desired position. The pourable sealing device may be made of an elastic material, and therefore the separation devices may be used to stabilise the pourable-sealing device. The pourable-sealing device may essentially be solely responsible for sealing. It may thus be possible for the separation devices to be produced with small tolerances.

Below, improvements of the invention are described with reference to the conductor leadthrough. These embodiments also apply to the housing apparatus, to the field device, and to the method for producing the conductor leadthrough.

According to a further aspect of the present invention, the external conductor can be assembled from several parts from a plurality of external conductor components so that in its disassembled state the pourable-sealing device is accessible.

For example, UV light may be able to be conveyed to the pourable-sealing device, which UV light can be used for curing the pourable-sealing device. The components of the external conductor may be connectable or producible by means of a screw connection, a press connection or a solder connection. To this effect the components of the external conductor may be correspondingly shaped. For example, they may comprise threads or flanges, grooves or springs.

According to yet another aspect of the present invention, the conductor leadthrough comprises a second separation device, wherein the second separation device and the at least one first separation device are spaced apart along the longitudinal axis of the external conductor. As a result of such spacing apart, the at least one first separation device and the second separation device separate a section of the hollow internal region of the external conductor.

As a result of the separation of a section of the hollow internal region of the external conductor, a chamber may arise which may be filled with the pourable-sealing device. Thus it may be possible to fill the pourable-sealing device into the chamber in any desired position.

According to a further aspect of the present invention, the conductor leadthrough comprises a coaxial internal conductor, wherein the coaxial internal conductor is arranged along the longitudinal axis in the hollow internal region of the external conductor. The sealing apparatus, in particular the at least one first separation device, the second separation device and the pourable-sealing device are equipped so that they align the coaxial internal conductor in a central region of the hollow internal region of the external conductor.

For example, the sealing apparatus may align, affix or centre the internal conductor coaxially to the external conductor. The external conductor may be a metal cylinder or a metal tube, while the internal conductor may be a solid cylinder with a correspondingly smaller radius than that of the external conductor. Between the internal conductor and the external conductor a distance may be present. In order to keep this space constant along the length of the conductor leadthrough, a sealing apparatus may be used as a spacer.

The sealing apparatus may be made from different materials. In particular, the at least one first separation device, the second separation device and the pourable-sealing apparatus may comprise different materials with different material characteristics. Consequently the sealing device may be inhomogeneous. For example, the at least one first separation device, the second separation device and the pourable-sealing device may comprise different relative dielectric constants $\in_r$. These different material characteristics along the longitudinal axis may, along the longitudinal axis, correspondingly lead to locations of discontinuities, i.e. sudden differences, in the electrical characteristics. For example, sudden changes in the relative dielectric constant can affect the electrical propagation of electromagnetic waves or of electromagnetic signals along the conductor leadthrough.

The design of the sealing apparatus from the at least one first separation device, the second separation device and the pourable-sealing device may lead to butt joints between the different devices comprising different materials. Due to the different relative dielectric constants $\in_r$ of the materials, the propagation behaviour of an electrical signal may be influenced. In particular, a guided electromagnetic wave may be influenced. Thus, by providing the inhomogeneous sealing apparatus, butt joints could arise that could lead to undesirable attenuation behaviour of an electrical signal or of a guided electromagnetic wave. The sealing apparatus could thus have a negative effect on the propagation behaviour of the electrical signal.

By means of the selection of the internal diameter of the external conductor, and also by means of the selection of the external diameter of the internal conductor, the attenuation behaviour or the propagation behaviour of a guided electromagnetic wave may also be able to be influenced. Thus by means of the selection of the internal diameter of the external conductor, of the external diameter of the internal conductor, and in particular of the ratio of external diameter to internal diameter, it may be possible to counteract the negative effects resulting from butt joints. In this arrangement the aim of keeping the wave impedance of the overall arrangement essentially constant at 50Ω along the longitudinal axis of the external diameter may be pursued.

According to yet another exemplary embodiment of the present invention, the coaxial internal conductor comprises at least one spring contact.

By means of a spring contact or a slotted internal conductor it may be possible to contact a plug or a printed circuit board.

According to another aspect of the present invention, the internal conductor comprises at least one bend, wherein the bend is equipped to contact an electrical conductor.

By means of the cladding or lateral surface area of the internal conductor the bend of the internal conductor may make it possible to create a large-area connection area for contacting a printed circuit board. Placement of a conductor leadthrough onto a printed circuit board may be simplified by means of a bent internal conductor. Furthermore, contacting by means of a bent internal conductor may obviate the need to use a spring contact for contacting. As has already been shown, the function of a spring contact may be negatively affected by thermal or mechanical loads.

According to vet another aspect of the present invention, at least one separation device selected from the group of separation devices comprising the at least one first separation device and the second separation device is arranged on an internal wall of the external conductor by means of a press seat.

In order to produce the press seat, the at least one first separation device or the second separation device may be produced with overmeasure or over size. This means that the separation device may comprise an external diameter whose shape corresponds to the shape of an internal diameter of the external conductor, wherein a radial space of the contour of the separation device exceeds the radial space from the longitudinal axis of the internal contour of the external conductor.

When a separation device is inserted into the hollow internal region of the external conductor, consequently the contour of the separation device may be adaptable to the contour of the external conductor. For the purpose of fitting, it may be necessary to heat the external conductor or the separation device.

In other words, the separation device may be pushed against the external conductor, as a result of which a firm seat of the separation device in the external conductor can be established. The separation device may thus stop a material flow that might try to move in the internal region of the external conductor in the direction of the longitudinal axis.

In this way a low leakage rate for propagation of a material, of a substance or of a fluid in the direction of the longitudinal axis may be able to be set. However, the insertion of a separation device may also negatively affect the propagation of an electromagnetic wave along the external conductor, As a result of the selection of the shape of the internal contour of the external conductor, and in particular of the shape of the external contour of the internal conductor, it may be possible to compensate for the negative effects on the propagation characteristics of an electromagnetic wave. In other words, by means of the selection of the shape of the external conductor and of the internal conductor, it may be possible to compensate for the negative effects on the propagation characteristics of an electromagnetic wave by means of a sealing apparatus.

The external conductor and the internal conductor may be made from metal. In particular, the external conductor and the internal conductor may be gold-plated.

By means of insertion of the first separation device, of the second separation device and of the pourable-sealing device, a zone-separating leadthrough may be producible.

The at least one first separation device and the second separation device may be made from PTFE (e.g. Teflon) or PEEK. The pourable-sealing device may be made from epoxy resin, silicone, a single-component pourable-sealing system, a two-component pourable-sealing system or a UV-curing pourable-sealing system. The combination of the at least one first separation device, the second separation device and/or the pourable-sealing device may form a sealing apparatus with a low leakage rate.

Teflon may comprise a permittivity value (DK value), a dielectric constant $\in_r$ or a relative dielectric constant $\in_r$ of 2.2. The pourable-sealing device may comprise a permittivity value (DK value) of 3.

According to another aspect of the present invention, the external conductor comprises an elevation, wherein the elevation extends from an internal surface of the external conductor into the hollow internal region of the external conductor. The elevation extends into the hollow internal region so that, when the elevation establishes contact with at least one device selected from the group of devices comprising the pourable-sealing device, the at least one first separation device and the second separation apparatus, movement of the sealing device along the longitudinal axis is restricted.

The elevation, the edge, the flange or the shoulder may be used as a support so as to prevent any displacement of the sealing apparatus within the external conductor. Not only may displacement be prevented due to frictional forces, which frictional forces, due to the press seat, arise between the separation device and the external conductor, but the elevation may also represent a mechanical barrier.

According to yet another aspect of the present invention, the external conductor is designed as a housing coupler.

A housing coupler may have the characteristic in that an external shape of the housing coupler or of the conductor leadthrough is adapted so that the housing coupler may engage a housing or a partition of a housing apparatus so that the housing coupler is integrated in the housing. This means that there may be a close contact between the housing coupler and the housing.

The housing coupler may be made from copper-zinc (CuZn) and may form part of the external conductor or may form the external conductor. The housing coupler can be a turned part or a milled part into which the internal conductor is inserted. The internal conductor may, for example, be made from copper-beryllium (CuBe).

By adapting the contour of the conductor leadthrough to a housing shape, it may be possible to obviate the need to use an additional installation material when affixing the conductor leadthrough to the housing. For example, the conductor leadthrough, in particular the external conductor, may already comprise a flange by means of which the conductor leadthrough can be integrated in a housing. The conductor leadthrough can be secured against displacement by means of the housing coupler.

According to yet another exemplary embodiment of the present invention, the external conductor comprises at least one hole, wherein the at least one hole forms a passage from an external region of the external conductor to the hollow internal region of the external conductor.

The at least one hole is positioned along the longitudinal axis so that the section of the hollow internal region of the external conductor, which section is separated by the at least one first separation device and/or the second separation device, is accessible by way of the hole so that the pourable-sealing device can be inserted into the section by means of the hole.

Thus, by way of the hole, the interior of a coaxial conductor or of a hollow conductor may be accessible and fillable. In other words, as long as the separated section has not yet been filled in, filling-in can take place by way of the hole.

Positioning the hole so that the separated hollow internal region, or at least a section of the divided hollow internal region, of the external conductor is accessible may make it possible, during the production of the conductor leadthrough, to inject the pourable-sealing device into the hollow space. For example, a dispenser needle may be used for injection. Injection may also make it possible, by means of the pourable-sealing element, to build up pressure in the direction of the separation device so that the pourable-sealing material is pressed and held in possibly present spaces between the separation device and the external conductor. The pourable-sealing material may be the material from which the pourable-sealing device is made. For example, the pourable-sealing material may be epoxy resin or silicone.

By using a hole it may be possible to insert the pourable-sealing device after the separation device has been inserted. In addition to the at least one hole a further hole may be used, which hole makes it possible, when the hollow space is being filled, to let air escape from the hollow space.

According to another aspect of the present invention, the at least one first separation device is designed as a disc.

For example, the at least one first separation device is designed as a Teflon disc that is adapted to the internal dimensions of an external conductor. In this arrangement, adaptation may take into account the corresponding overmeasure or oversize for a snug fit.

Production as a disc, which for example comprises a hole in the centre, may make it possible to determine the central position of the internal conductor in the external conductor.

According to yet another aspect of the present invention, the second separation device is designed as a socket or bush.

The second separation device in combination with the internal conductor, and in particular with the slotted internal conductor or the spring contact of the internal conductor and the external conductor, may form a compact connection apparatus to which a plug can be connected. The shape of this connection apparatus or socket may be able to be adapted so that the connection apparatus forms a standard HF connector, e.g. SMB (subminiature coaxial plug-type connection), SMC (subminiature coaxial plug-type connector), SMP (micro-miniature coaxial plug-type connection) or mini SMP. For example, it may also be possible for the second separation device to increase the force acting on a spring contact at the end of the internal conductor.

According to another aspect of the present invention, at least one separation device selected from the group of separation devices comprising the at least one first separation device and the second separation device is made of Teflon.

Teflon may have a permittivity value (DK value) of 2.2, as a result of which there may be a minor discontinuity in the permittivity value vis-à-vis the permittivity value of a pourable-sealing device of 3.

According to yet another exemplary embodiment of the present invention, one end of the conductor leadthrough is designed as a standard high-frequency connector (HF connector).

Designing one end of the conductor leadthrough as an HF connector may be used to connect measuring probes that also comprise standard HF connectors. For example, this may also ensure that the wave impedance is, for example, adapted to 50Ω.

Below, improvements of the invention are described with reference to the housing apparatus. These embodiments also apply to the conductor leadthrough, to the field device and to the method for producing the conductor leadthrough.

According to a further aspect of the present invention, the housing apparatus comprises a printed circuit board, wherein the printed circuit board is arranged in the electronics space region so that the printed circuit board can contact an internal conductor of the conductor leadthrough. Furthermore, the external conductor may contact the printed circuit board. To this effect the external conductor may, for example, be soldered onto the printed circuit board.

The printed circuit board may, for example, be connected or soldered to the bent end of an internal conductor of a conductor leadthrough. As a result of the bending radius of the bent end of the internal conductor the printed circuit board may be easily joinable to the internal conductor.

According to yet another aspect of the present invention, the housing apparatus comprises a shielding device, wherein the shielding device is adapted to shield electromagnetic interference effects from the electronics space region, which interference effects act from the direction of the connection region to the electronics space region.

For example, a measuring probe can be connected in the connection space region. This measuring probe may generate electromagnetic compatibility (EMC) interference, which could interfere with an evaluation electronics that are present in the electronics space region. Conversely, the evaluation electronics could also generate EMC interference, which could have negative effects on the measuring probe or on the measuring sensor. Interferences that may move either in the direction of the measuring probe or in the direction of the evaluation electronics may be kept away by means of a shielding device. In particular an electrical shielding device or an electrical mesh may be used.

According to yet another aspect of the present invention, the shielding device is adapted to space the printed circuit board apart from the housing separation device so that an air-filled hollow space is created between the printed circuit board and the housing separation device.

The air-filled hollow space may ensure the presence of conditions under which the printed circuit board, in particular a circuit on the printed circuit board, has been tested.

According to yet another exemplary embodiment of the present invention, the electronics space region comprises a pourable-sealing material or a grouting.

The pourable-sealing material may protect a printed circuit board in the electronics space region against ingressing dangerous substances, for example acid or alkaline solutions or condensation water. On the other hand the pourable-sealing material may also prevent sparking that could ignite a potentially explosive gas. Furthermore, the use of a pourable-sealing material in the electronics space region may make it possible to obtain approval for use in a potentially explosive region.

According to a further aspect of the present invention, the field device is selected from the group of field devices comprising a fill-level measuring device, a flow meter, a radar measuring device or a measuring device based on the principle of a guided microwave. The field device could also be a pressure measuring device.

Below, improvements of the invention are described with reference to the production method. These embodiments are also to apply to the conductor leadthrough, to the housing apparatus and to the field device.

According to a further aspect of the present invention, a second or further separation device is inserted in the hollow internal region of the external conductor so that the at least one first separation device and the second separation device are arranged so as to be spaced apart along the longitudinal axis of the external conductor. By means of this spaced-apart arrangement the at least one first separation device and the second separation device separate a section of the hollow internal region of the external conductor.

According to yet another aspect of the present invention, filling the pourable-sealing device into the section of the hollow internal conductor takes place through at least one hole in the external conductor.

According to yet another aspect of the present invention, the internal conductor is turned, slotted, bent and hardened. Furthermore, the internal conductor is, for example, galvanised with gold and is inserted into the external conductor so that, by means of at least one device selected from the group of devices comprising the at least one first separation device, the second separation device and the pourable-sealing device, the internal conductor is aligned in the interior of the hollow space of the external conductor. Filling of the separated section of the hollow internal region of the external conductor takes place after the internal conductor has been inserted into the external conductor.

According to this aspect, the term "turning" may refer to production by means of a turning method.

The pourable-sealing system or the pourable-sealing device may be evacuated before it is inserted into the external conductor. During evacuation, any trapped air or trapped gas may be removed so that a homogeneous structure arises.

Alternatively, the pourable-sealing system may be a UV adhesive (ultraviolet adhesive). A UV adhesive can be cured by means of radiation from a UV lamp. However, the use of the UV adhesive may necessitate the use of a two-part external conductor in order to make it possible to apply radiation from the UV light of the UV lamp. The two parts of the external conductor can be designed so as to be screwable or pressable in order to make it possible, after curing of the UV adhesive, to connect the external conductors by means of screwing or pressing.

The at least one first separation device may, for example, be designed as a Teflon disc. The second separation device may, for example, be designed as a Teflon socket or Teflon tube. Both the at least one first separation device and the second separation device may already comprise a central hole for inserting the internal conductor. This central hole might cause the pourable-sealing device to escape when the hollow space is being filled in. Therefore, inserting the internal conductor into the hole of the disc or into the hole of the socket may prevent the pourable-sealing device from escaping through the holes.

BRIEF DESCRIPTION OF DRAWINGS

Below, advantageous exemplary embodiments of the present invention are described with reference to the figures.

DETAILED DESCRIPTION

Figure 1:
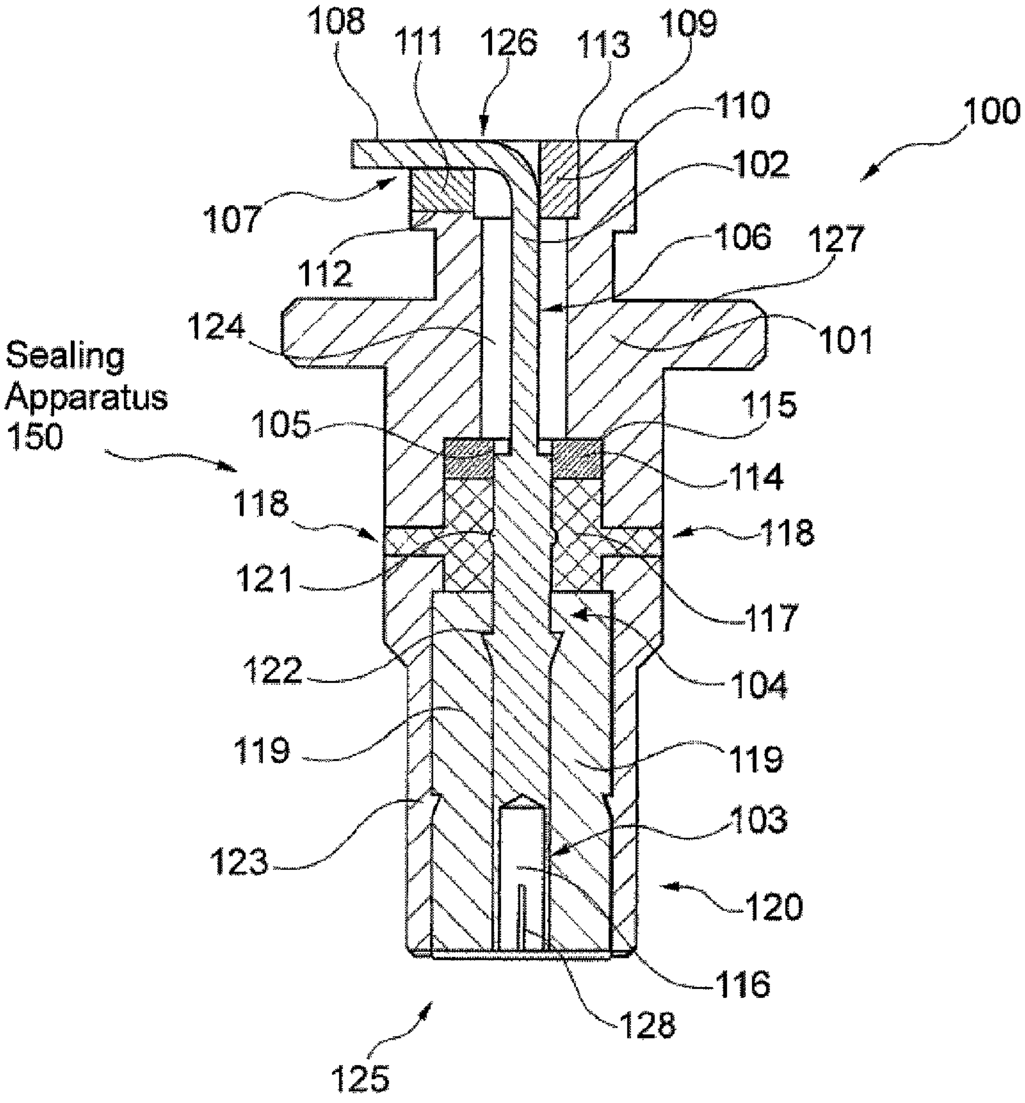
FIG. 1 shows a cross section of a conductor leadthrough according to an exemplary embodiment of the present invention.

The illustrations in the figures are diagrammatic and not to scale. In the following description of FIGS. 1 to 30 the same reference characters are used for identical or corresponding elements.

FIG. 1 shows the conductor leadthrough 100 with the external conductor 101 or the housing coupler 101 respectively and the internal conductor 102. The internal conductor 102 extends centrally into the external conductor 101 along a longitudinal axis of the external conductor 101.

The internal conductor 102 essentially comprises four sections. In the region of a first end 103 a spring contact for accommodating the internal conductor of a plug (not shown) is shown. A second partial section 104, in which the internal conductor essentially comprises a diameter that is predetermined by the characteristics of the spring contact region 103, extends to the shoulder 105.

In the region of the shoulder 105 the diameter of the internal conductor 102 suddenly changes. The diameter is reduced when compared to the diameter in the region of the spring contact region 103. The sudden change takes place within the Teflon disc 114. On the side of the Teflon disc, which side faces the spring contact region 103, the internal conductor comprises a large diameter. On the side of the Teflon disc 114 that faces the bent end 108 of the internal conductor, the internal conductor comprises a narrow diameter.

The region, in which the internal conductor 102 extends with a small diameter, forms the third partial section 106 of the internal conductor 102. This narrow partial section 106 of the internal conductor essentially extends into an air-filled hollow internal region 124 of the external conductor 101. As a result of the reduction in the conductor cross section in the region 106, it is possible to take account of the different relative dielectric constant of air when compared to that of Teflon.

The internal conductor 102 further comprises a fourth partial section 107, wherein the partial section 107 is essentially bent by 90 degrees when compared to the extension of the internal conductor 102 in the regions 103, 104, 105 and in particular when compared to the orientation of the longitudinal axis of the external conductor 101. As a result of the bend in the internal conductor 102 and the curved shape of the internal conductor in the partial section 107, a lateral surface area 108 of the internal conductor essentially extends parallel to the surface 109 of a flange-shaped end of the external conductor 101. The conductor leadthrough 100 can thus be soldered to the lateral surface area 109 and to the flange-shaped end section on a printed circuit board (the latter is not shown in FIG. 1).

In all four partial regions 103, 104, 106, 107 the ratio of external diameter of the internal conductor 102, the internal diameter of the external conductor 101 and the relative dielectric constant $\in_r$ of the socket 119, the relative dielectric constant $\in_r$ of the pourable-sealing device 117, the relative dielectric constant $\in_r$ of the Teflon disc 114 or the relative dielectric constant $\in_r$ of the air in the region 124 are selected so that the wave impedance of the conductor leadthrough 100 is 50Ω.

Two support devices 110, 111 are provided to support the bent shape of the internal conductor 102. The support device 110 is an insulating support 110. The support device 111 is an insulating ring 111. The insulating ring 111 spaces the internal conductor 102 from an end edge 112 of the external conductor 104 in a plane that extends at 90 degrees to the longitudinal axis of the external conductor 101. The insulating support 110 spaces the internal conductor 102 apart from an internal edge 113 of the external conductor 101, wherein the internal edge 113 extends parallel to the longitudinal axis of the external conductor 101. Here again, a wave impedance of 50Ω applies.

The support devices 110 and 111 thus ensure that the internal conductor 102 is spaced apart from the external conductor at constant spacing.

Furthermore, the at least one first separation device 114 or the Teflon disc 114 ensure that the internal conductor 102 is spaced apart from the external conductor 101 at constant spacing. The Teflon disc 114 rests against the shoulder 115, wherein the shoulder 115 prevents movement of the Teflon disc 114 in the direction of the bent end 107 of the internal conductor 102. Such a movement in the direction of the bent end 108 of the internal conductor 102 is also prevented by a press fit due to the frictional effect that arises, with which press fit the Teflon disc 114 has been pressed into the external conductor 101. The changeover from the broad diameter of the internal conductor 102 to the narrow diameter of the internal conductor 102 takes place within the Teflon disc 114. This changeover is step-shaped.

The pourable-sealing device 117 is arranged within a chamber-shaped hollow space. The chamber-shaped hollow space is a section of the hollow internal region of the external conductor 101. The chamber-shaped hollow space is delimited by the internal surface of the external conductor 101, the Teflon disc 114 and the socket 119, and is accessible by means of the holes 118. In each case the Teflon disc 114 and the socket 119 comprise at least one surface each that is arranged so as to be parallel to each other.

In the direction of the end of the external conductor 101, which end comprises the spring contact 116, the pourable-sealing device or the pourable-sealing system 117 adjoins the Teflon disc 114. By way of the holes 118 in the external conductor 101 the pourable-sealing system 117 can be injected into a hollow space between the Teflon disc 114 and the socket 119 to form the sealing apparatus 150 (FIG. 1 shows the conductor leadthrough 100 with the pourable-sealing device 117 injected. Consequently, in FIG. 1 the hollow space is shown as a filled-in hollow space). The socket 119 is also arranged in a slide-proof manner within a hollow space of the external conductor 101 by means of a press fit and a shoulder.

The socket 119 adjoins the pourable-sealing system 117 along the longitudinal axis of the external conductor 101. Together with the internal conductor 102, and in particular the spring contact 116 of the internal conductor 102, the socket 119 forms an electrical contact for connecting a plug. The external conductor 101 is made from a conductive material. A plug which establishes contact with the socket 119 and the spring contact and the external conductor 101 also comprises a coaxial design.

The plug (not shown in FIG. 1) comprises an internal conductor that establishes contact with the spring contact 116. Furthermore, the plug comprises an external conductor which, near the socket region 120, by way of an insulator is plugged over the external conductor 101 of the conductor leadthrough 100 so as to be galvanically separated. The plug and the socket overlap, for example by $\lambda/4$, wherein $\lambda$ denotes the wavelength of the conveyed electromagnetic wave. In this case the plug-type connection is a $\lambda/4$ connection.

The round indentation element 121 and the angular indentation element 122 of the internal conductor 102 form an additional displacement safeguard of the internal conductor 102 within the external conductor 101. Furthermore, the indentation element 123, which extends from the external conductor 101 into an internal region of the external conductor 101, prevents displacement of the socket 119 within the external conductor 101.

In a direction starting from the socket-shaped end 120 of the conductor leadthrough 100 in the direction of the angled end 108 of the internal conductor 102, the arrangement of the sealing apparatus 114, 117, 119 results in a sequence of materials with different relative dielectric constants $\in_r$. In the region of the socket-shaped end 120 propagation of an electromagnetic wave that moves along the longitudinal axis is determined by the relative dielectric constant $\in_r$ of the socket 119. Subsequently, propagation is determined by the relative dielectric constant $\in_r$ of the pourable-sealing system 117, and thereafter by the relative dielectric constant $\in_r$ of the Teflon disc 114. Subsequently, propagation of the electromagnetic wave is determined by the relative dielectric constant $\in_r$ of air. In this region 106 air surrounds the internal conductor 102.

As a result of the sequence of different relative dielectric constants $\in_r$, discontinuities or butt joints arise, which can result in impedance steps in the changeover regions and beyond.

By means of the sealing apparatus 119, 117, 114 a hollow internal region 124 between the internal conductor 102 and the external conductor 101 is sealed off essentially in longitudinal direction of the external conductor 101. The material, which can still find its way from a first spatial region 125 to a second spatial region 126 outside the conductor leadthrough 100, is determined by the leakage rate or helium leakage rate of the combined sealing apparatus 114, 117, 119 and the pressure differential between the two space regions 125, 126.

FIG. 1 also shows that it is adequate to provide only the at least one first separation device 114. During production, the conductor leadthrough with the bent end 108 of the internal conductor 102 can be held in the direction of the earth surface. Providing there is no socket 119, the pourable-sealing device 117 can be filled in by way of the first end 103 or the socket region 120 from the side of the first space region 125. After the pourable-sealing device 117 has cured, optionally the socket 119 can be inserted in order to improve the sealing characteristic.

By means of the press fit, the separation devices 114, 119 provide a seal to the external conductor 101. The separation devices 119, 114 also provide a press seat, and thus a seal, to the internal conductor 102.

The separation devices 114, 119 are made from hard, heat-resistant materials. Despite the press seat, said separation devices 114, 119 cannot adapt well to the contour of the internal region of the external conductor 101. Thus gap formation may occur between the internal conductor and the separation device 119, 114, and between the external conductor and the separation device 119, 114, which gap formation may result in a slight material flow.

Furthermore, due to material discontinuities a slight flow of material through the bodies of the separation devices 114, 119 along the longitudinal axis of the external conductor 101 may occur. Inserting the pourable-sealing system 117, which is pressed under pressure between the separation devices 114, 119, closes off any present gaps, thus reducing the leakage rate of the sealing apparatus 114, 117, 119. The pourable-sealing system 117 or the seal 117 serves as a buffer between the zones. The principal seal is provided by the pourable-sealing device 117.

The permittivity value of Teflon is 2.2, the permittivity value of ceramics is 9.9, the permittivity value of glass is 4.9, the permittivity value of the pourable-sealing system 117 is 3. The jump in the permittivity value from Teflon to ceramics, or the jump in the permittivity value from Teflon to glass, is considerably greater than the jump in the permittivity value from Teflon to that of the pourable-sealing system 117. If the permittivity values of adjacent materials differ only by little, then only small discontinuities are present and there are only small jumps in the wave impedance. Thus, better changeovers can be produced, and, furthermore, better transmission behaviour can be achieved.

In the socket region 120 the internal diameter of the external conductor 101 is 4.1 mm, and the external diameter of the internal conductor 102 is 1.26 mm.

In the separated region, which region comprises the pourable-sealing device 117, the internal diameter of the external conductor 101 is 3.5 mm, and the external diameter of the internal conductor 102 is 1.26 mm.

From the region of the shoulder 105, i.e. in the hollow internal region 124 that comprises air, the internal diameter of the external conductor 101 is 1.9 mm, and the external diameter of the internal conductor 102 is 0.6 mm.

The length of the pourable-sealing device 117 along the longitudinal axis of the external conductor 101 should be at least 1 mm.

The two holes 118 are used both for insertion of a dispenser needle to fill pourable-sealing material 117 into the hollow space, and for air to escape during the filling process. During filling, the first separation device 114 and the second separation device 119 prevent the pourable-sealing system 117 from reaching undesirable regions, for example the air-filled hollow internal space 124 of the external conductor 101.

The housing coupler 101 or external conductor 101 comprises the collar 127 or flange 127 that can be used for attachment to a housing, in particular to an JIF housing.

The spring effect of the contact 116 is achieved by means of a slot 128, wherein when an internal conductor is inserted into the spring contact 116, the spring contact 116 is pressed against the socket 119. As a result of the pressure, the frictional force that acts on the internal conductor of a plug can be increased. Consequently, the hold of the plug in the socket 119 can be strengthened.

Conveyance of electromagnetic signals or of electrical power can take place by way of the internal conductor 102 and the external conductor 101. An electromagnetic wave is guided along the external conductor 101 and makes it possible for signals to be exchanged between the space regions 125, 126 by way of the sealing apparatus 114, 117, 119. The signals can, for example, transmit measurement values.

By means of the selection of the geometric shapes of the components of the conductor leadthrough 100, and by means of the selection of the materials for the conductor leadthrough 100 it is possible to optimise the conveyance of electromagnetic signals or of power. On the connection side 125, in particular in the connection space region 125 and in the electronics space region 126, the conductor leadthrough 100 in each case comprises a wave impedance $Z_w$ of 50Ω. The conductor leadthrough 100 is thus adapted to conductors or lines that are used in high-frequency applications.

By means of insertion of the pourable-sealing system 117 a sealing effect can be achieved that is comparable to the sealing effect of a glass seal when the glass seal is soldered to the external conductor 101 or when the glass seal is bonded into the external conductor 101. However, the expenditure associated with bonding or soldering can be avoided with the design shown in FIG. 1. Thus it is essentially also possible to avoid the danger of the adhesive seal between the separation device 114, 119 and the external conductor 101 breaking off.

The socket 119 with the spring contact 116 form a coaxial plug with a special interface. The conductor leadthrough 100 of FIG. 1 is a variant of a coaxial HF plug-type connection with a pourable-sealing system 117 for the frequency range around 26 GHz. The conductor leadthrough 100 is designed in a single part as an SMD variant. In other words the conductor leadthrough can be affixed to a printed circuit board by means of an automatic SMD pick-and-place machine.

The electrical data of the conductor leadthrough 100 comprises a wave impedance of 50Ω, with the frequency range ranging from 5 GHz to 7 GHz. In the case of a frequency range of 5 GHz to 7 GHz the thickness of the printed-circuit-board material is 0.635 mm. In the case of a frequency range of 24 GHz to 27 GHz the thickness of the printed-circuit-board material is 0.254 mm. Such printed circuit boards are, for example, produced by the Rogers Corporation and are marketed by the name Rogers RO3010 and RO3003.

The reflection attenuation, i.e. the attenuation parameter $S_{11}$, or wave parameter $S_{11}$, is at least 18 dB, and the dielectric strength exceeds 500 V. The internal conductor 102 is designed to comprise warm-cured CuBe and is gold plated, and the external conductor 101 from a gold-plated copper alloy. The insulation, seal, sealing contrivance or sealing apparatus 114, 117, 119, in particular the insulating ring 111 and the insulating support 110, comprise PTFE or PEEK. The copper alloy of the external conductor 101 comprises, for example, CuZn. The socket 119 is made from PTFE.

The reflow soldering temperature which the conductor leadthrough is able to withstand is 260° C. for 40 seconds. The conductor leadthrough 100 can operate at a temperature range of −50° C. to +90° C. The permissible gas tightness specified by the standard EN60079-26:2004 and that is met by the conductor leadthrough 100 is less than $1\times10^{-4}$ mbar $$\frac{l}{\text{sec}},$$

i.e. millibars times liters per second. The thickness of the pourable-sealing system 117 along the longitudinal axis is at least 1 mm, wherein the pourable-sealing system 117 meets the requirements of proof of adhesion.

Figure 2:
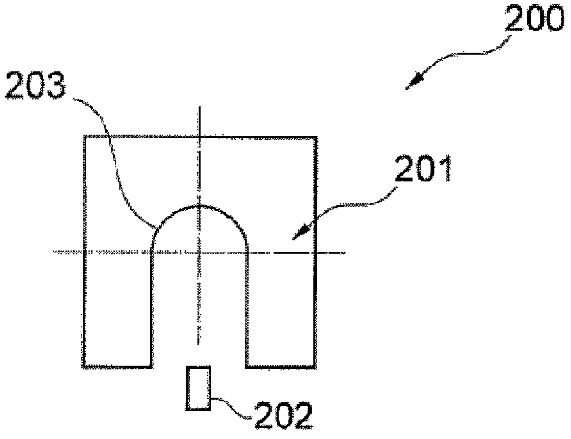
FIG. 2 shows a layout of a printed-circuit-board structure according to an exemplary embodiment of the present invention.

FIG. 2 shows a layout 200 of a printed-circuit-board structure. The diagram shows the square cross section of the connection area 201 that for the purpose of connecting the external conductor 101 comprises a contour that corresponds to the shape of the external conductor 101 at one end 126 of the conductor leadthrough 100. The connection area 201 is used to support the external conductor 101 on the printed circuit board and to solder it to said printed circuit board. The internal conductor 102 is connected, by means of soldering, to the rectangular connection structure 202 which faces the U-shaped recess 203. The shape of the U-shaped recess 203 corresponds to the shape of the internal edge 113 of the external conductor 101.

The printed circuit board can be produced by means of the layout 200 or the mask 200 for the printed-circuit-board structure. During production of the printed circuit board, this layout 200 is transferred to the printed circuit board; it corresponds to the conductive regions on the printed circuit board.

Figure 3:
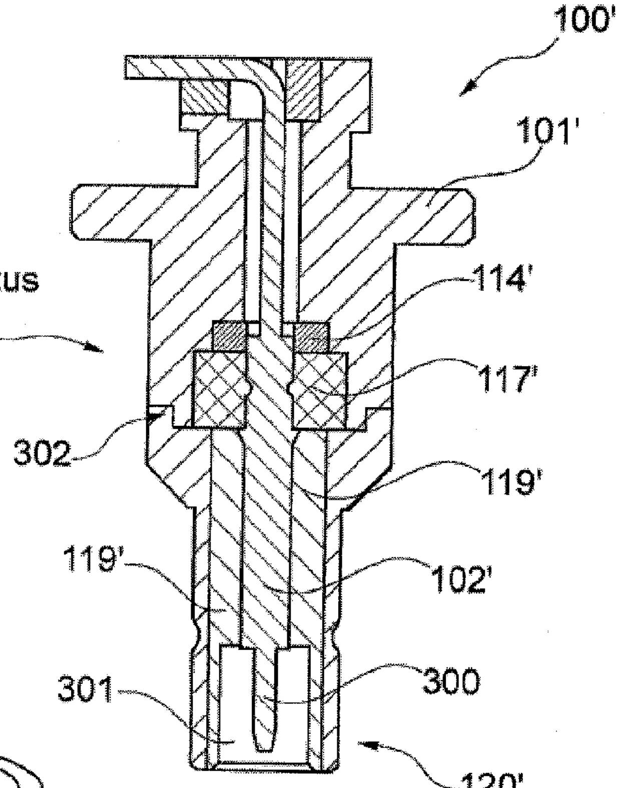
FIG. 3 shows a further cross section of a conductor leadthrough according to an exemplary embodiment of the present invention with a standard plug-type HF connector.

FIG. 3 shows a conductor leadthrough 100 that is designed as a variant of the coaxial HF plug-type connection with a pourable-sealing system for the frequency range of up to max. 3 GHz as a single-piece SMD variant.

In contrast to FIG. 1, in the sealing apparatus 150', the diameter of the pourable-sealing system 117' is larger than that of the first separation device 114' and of the second separation device 119'. The correspondingly larger diameters and thus the greater spacing from the longitudinal axis of the external conductor 101' are also taken into account in the shape of the external conductor 101'. In FIG. 3 the socket-shaped end 120' of the conductor leadthrough 100' is designed as a standard plug-type HF connector, e.g. SMB. To this effect the socket-side end 120' of the internal conductor 102' is designed as a pin 300. On the socket-side end, the socket 119' comprises a cup-shaped recess 301. The dimensions of the pin 300 and of the cup-shaped receiver 301 correspond to the standard for the corresponding standard HF plug-type connector. The conductor leadthrough 100' is used for the electrically conductive connection of two conductors with the use of a guided microwave in the 3 GHz range.

FIG. 3 furthermore shows the joint 302 that permits a multi-part design of the external conductor 101'. On the joint 302 the external conductor 101' can be assembled or disassembled, for example by means of a press process or a screw process. For example, the pourable-sealing device 117' can be inserted in a direction along the internal conductor 102', while during injection the pourable-sealing device is inserted essentially at a right angle to the internal conductor 102'. Furthermore, with the external conductor 101' open, i.e. in a disassembled state of the external conductor 101', UV light can act on the pourable-sealing device 117', as a result of which the curing of the pourable-sealing device 117' is assisted.

Figure 4:
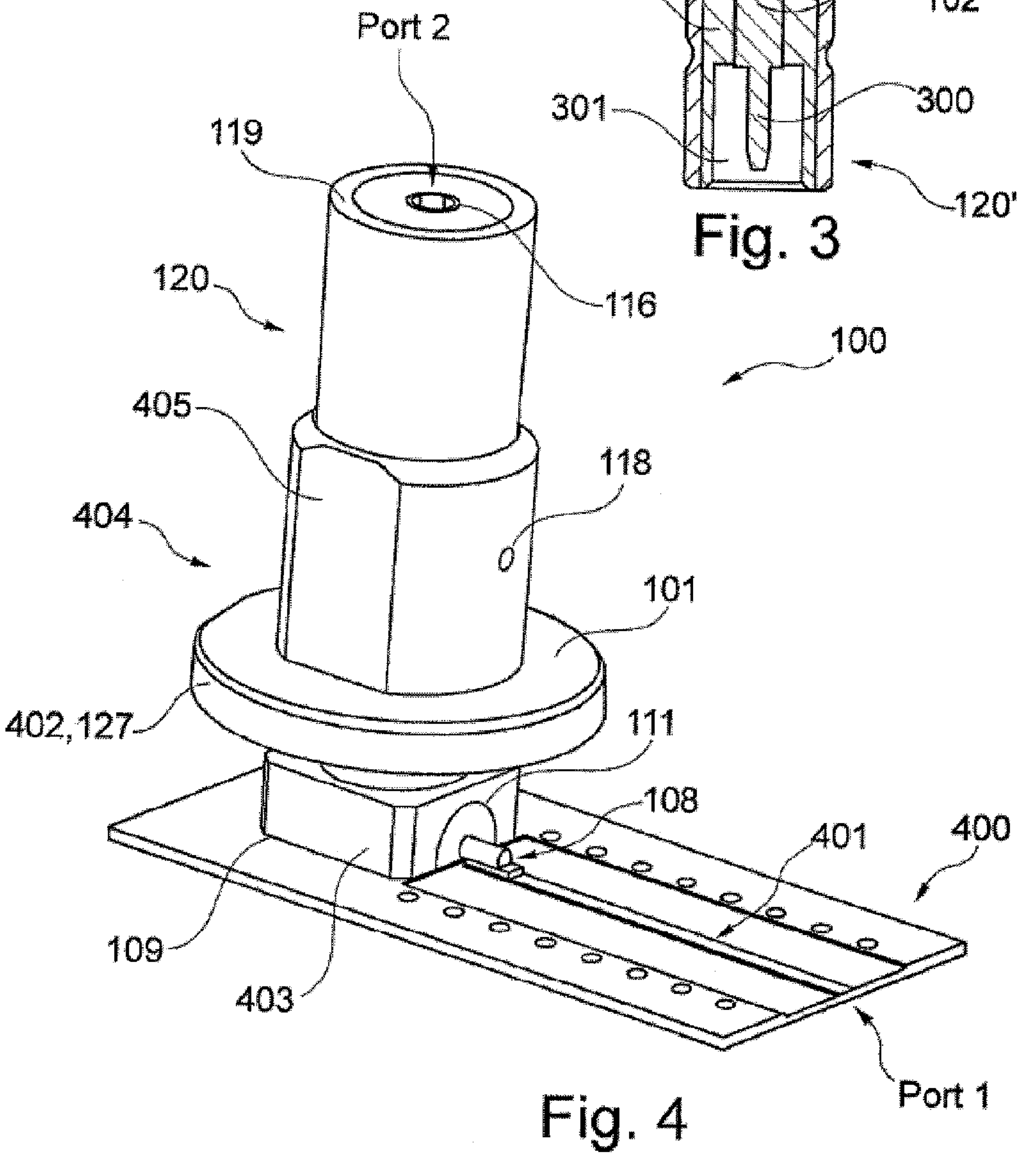
FIG. 4 shows a perspective view of a conductor leadthrough installed on a printed circuit board, according to an exemplary embodiment of the present invention.

FIG. 4 shows a perspective view of a conductor leadthrough 100 that is soldered onto a printed circuit board 400.

The diagram shows the interconnection of two connections, which in FIG. 4 are designated port 1 and port 2. Port 2 designates the spring contact 116 of the connector leadthrough 100, while port 1 designates the end of a strip line 401, wherein the strip line 401, microwave circuit 401 or strip conductor 401 is affixed to the printed circuit board 400. The angled section 108 of the internal conductor 102 is soldered to the strip conductor 401 by means of a soldering point.

The angled part 108 of the internal conductor 102 projects from the insulating ring 111. Furthermore, FIG. 4 shows the rectangular end region 109 of the external conductor 101, which is also soldered to the printed circuit board 400. Further away from the printed circuit board, the flange 402, 127 or the collar 402, 127 is shown on the external conductor.

The filling hole 118 is directed in the same direction as the angled part 108 of the internal conductor 102 and is arranged between the flange 402, 127 and the socket-shaped end 120 of the external conductor 101. The diameter of the external shape of the external conductor 101 in the region of the filling hole 118 is larger than that of the external region of the external conductor 101 in the region of the socket-shaped connection region 120. The diagram also shows that the spring contact 116 is embedded in the socket 119. The socket 119 is arranged between the external conductor 101 and the spring contact 116; said socket 119 centres the spring contact 116 in the centre of the external conductor 101.

On the connections port 1, port 2, conductors can be connected which are to be interconnected by means of the conductor leadthrough 100 and the printed circuit board 400. The conductor leadthrough 100 makes it possible to transmit signals between the connections port 2 and port 1. Thus a conductor that by means of an HF plug is connected to the socket-shaped end region 120, port 2 of the external conductor 101, can transmit a signal to a conductor that is connected to port 1. In particular, an assembly of evaluation electronics can be connected to port 1.

Figure 27:
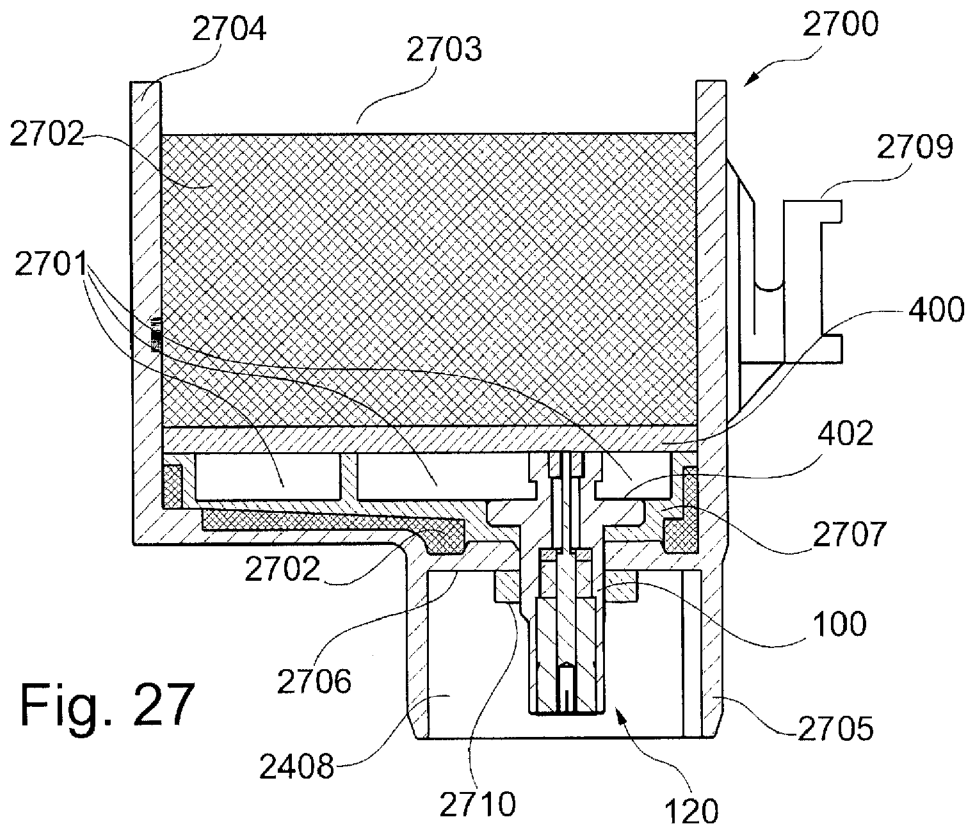
FIG. 27 shows a housing apparatus according to an exemplary embodiment of the present invention.

The flat section 404 of the external conductor 101, in which the hole 118 is situated, comprises the flat area 405. The flat area 405 serves as a rotation end stop during assembly in a housing 2700, as shown in FIG. 27.

Figures 5, 6, 7, 8, 9, 10, 11:
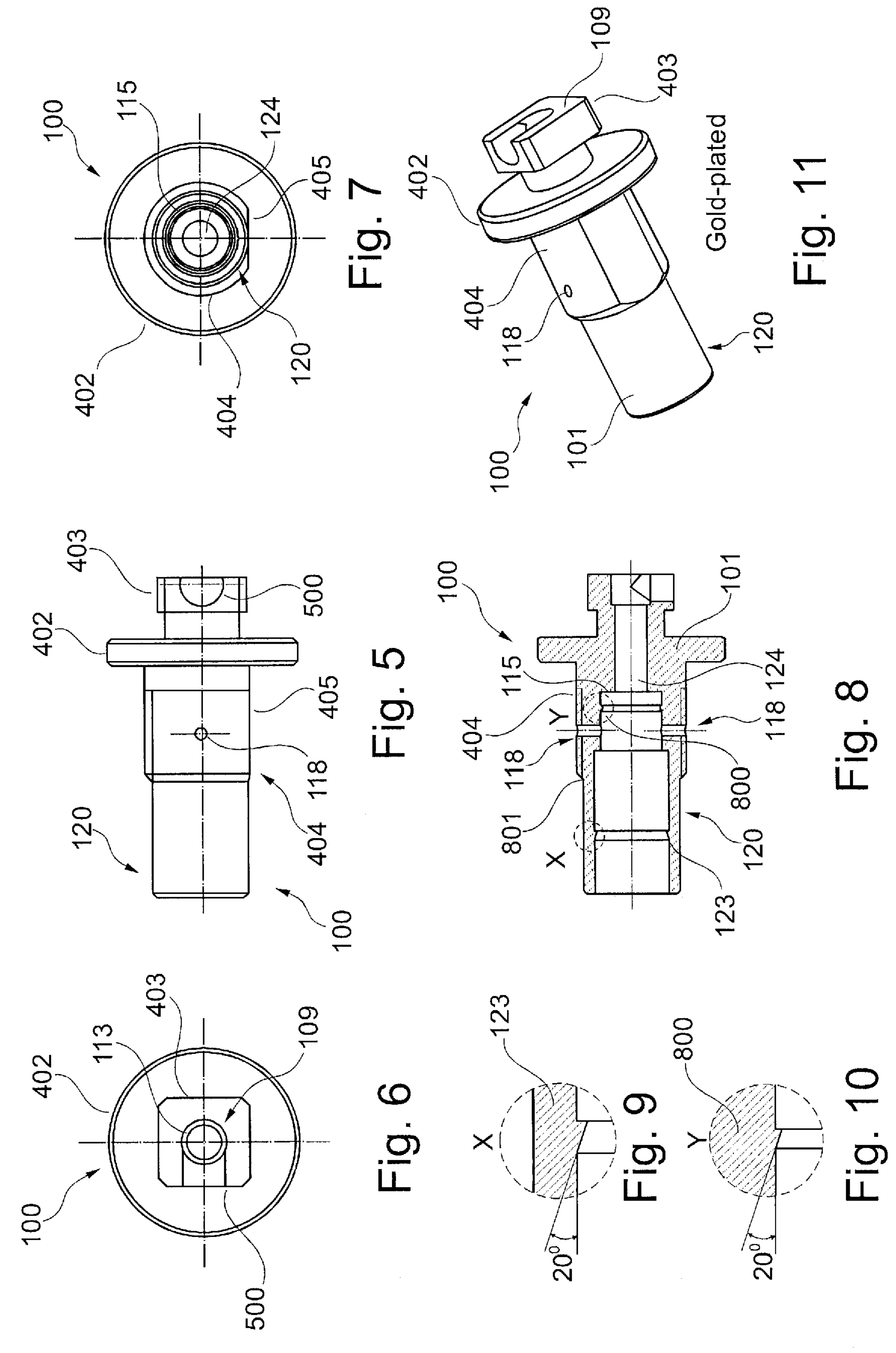
FIG. 5 shows a lateral view of a conductor leadthrough according to an exemplary embodiment of the present invention.
FIG. 6 shows a top view of the conductor leadthrough of FIG. 5, according to an exemplary embodiment of the present invention.
FIG. 7 shows a bottom view of the leadthrough of FIG. 5, according to an exemplary embodiment of the present invention.
FIG. 8 shows a cross section of the conductor leadthrough of FIG. 5, according to an exemplary embodiment of the present invention.
FIG. 9 shows a first section from the section view of the conductor leadthrough according to FIG. 8, according to an exemplary embodiment of the present invention.
FIG. 10 shows a second section from the section view of the conductor leadthrough according to FIG. 8, according to an exemplary embodiment of the present invention.
FIG. 11 shows a perspective view of a leadthrough according to an exemplary embodiment of the present invention.

FIG. 5 shows a lateral view towards the hole 118 of the housing coupler 101 or of the external conductor 101. FIG. 5 shows that as a result of the flat area 405 of the external conductor region 404 the design of the housing coupler 101 is asymmetric. The dimensions of the socket end region 120 correspond to those of a plug (not shown in FIG. 5). The plug that matches the socket can be plugged over the socket end region 120 so that electrical transmission between the plug and the external conductor 101 can take place. This means that a signal can be coupled into the conductor leadthrough 100.

Within the conductor leadthrough 100 capacitors may be used in order to establish galvanical separation between different regions of the internal conductor.

FIG. 5 further shows that the diameter of the external conductor 101, starting with the socket end region 120, to the hole section 404 and to the flange 402 increases in steps in the direction of the square end region 403 of the external conductor 100. From the flange 402 in the direction of the square end 403 the diameter first decreases, whereas in the region of the square end region 403 there is an increase again.

FIG. 5 further shows that the square end region 403 comprises a U-shaped opening 500 for the purpose of receiving the insulating ring 111 (not shown in FIG. 5).

FIG. 6 shows a top view of the square end region 403 of the conductor leadthrough 100. This top view shows that the flange 402 is of a circular design. Furthermore, the U-shaped receiver 500 for the insulating ring is shown.

FIG. 7 shows a bottom view of the housing coupler 101, wherein a concentric design of the flange 402, of the hole region 404 and of the socket region 120 is evident. The flat area 405 of the hole region 404 of the conductor leadthrough 100 differs from the concentric design. In the interior the circular design of the limit stop positions 115 for the separation devices 114, 119 is also shown. Furthermore, the air-filled passage 124 is shown.

FIG. 8 shows a cross section of the conductor leadthrough 100 of FIG. 5. This cross section shows that the holes 118 provide a connection from an external region outside the external conductor 101 in the internal region of the external conductor. In FIG. 8 the internal region of the external conductor 101 has not been filled in, i.e. it contains air.

The pourable-sealing system 117 can be injected through the opening 118. At the changeover to the region 124, which region remains filled with air after the pourable-sealing system 117 has been filled in, the shoulder 115 is shown, which serves as a limit stop for the at least one first separation device 114. Furthermore, the collar-shaped elevations 123 and 800 are shown, which provide an additional safeguard against displacement of the at least one first separation device 114 and the second separation device 119.

The bottle-shaped changeover 801 between the socket-shaped end region 120 and the hole region 404 of the external conductor 101 is used to provide a thread, by means of which the conductor leadthrough can be screwed into a housing. A spring washer and a nut can be installed over the external thread. The sealing apparatus is not shown in FIG. 8.

FIG. 9 shows a detailed view of the elevation 123 that is used to secure the socket 119 against displacement.

FIG. 10 shows a detailed view of the elevation 800 that is used to additionally secure the Teflon disc 114 against displacement.

FIG. 11 shows a perspective view of the conductor leadthrough 100 without the internal conductor. Also shown in the perspective view are the socket region 120 of the external conductor 101, the hole region 404 comprising the filling hole 118, and the flange 402, as is the square-shaped end region 403 with the area 109.

In order to increase the conductivity of the conductor leadthrough 100, the conductor leadthrough is gold-plated.

Figure 12:
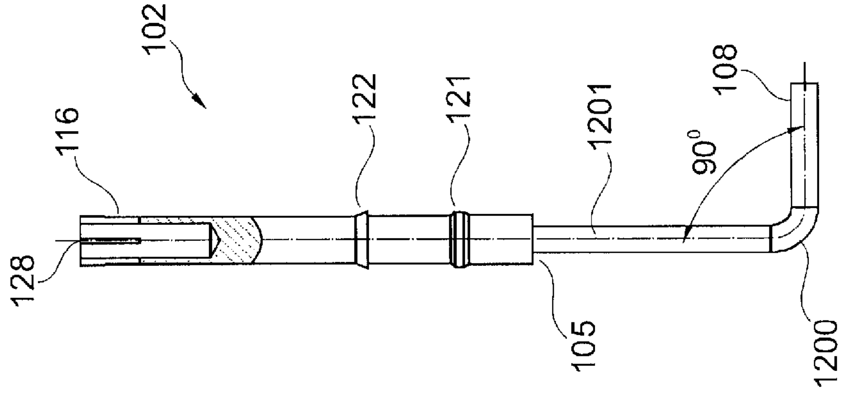
FIG. 12 shows a partial cross section of an internal conductor according to an exemplary embodiment of the present invention.

FIG. 12 shows the internal conductor 102 according to an exemplary embodiment of the present invention in its non-installed state. FIG. 12 shows the design of the spring contact 116 with the slot 128. The partial region of the spring contact 116 of one end of the internal conductor 102 is shown in section view. The spring contact 116 is essentially designed as a hole comprising a slot 128.

In the direction of the end region 108, which is angled at 90°, of the internal conductor there is the hook element 122, which expands in a cone-shaped manner along the internal conductor 102 before it is abruptly reduced to the radius of the internal conductor, whose radius is the same as the radius of the internal conductor in the region of the spring element 116. The hook-shaped element 122 is used to attach the internal conductor in the socket 119 (not shown in FIG. 12).

Furthermore, FIG. 12 shows the outward bulge 121 which is used to affix the internal conductor 102 in the pourable-sealing system 117, wherein the pourable-sealing system 117 is also not shown in FIG. 12. Between the elevation 121 and the angled end piece 108 there is a sudden reduction in the radius 105 of the internal conductor. In the installed state the region of the internal conductor with the reduced radius comes to rest in the hollow space 124 of the external conductor 101 according to FIG. 1, which hollow space is devoid of air. Up to the bend 1200 the radius remains constantly smaller than the radius in the region of the spring element 116, and at the bend 1200 the internal conductor 102 is bent by 90° relative to the longitudinal axis 1201.

Figure 13:
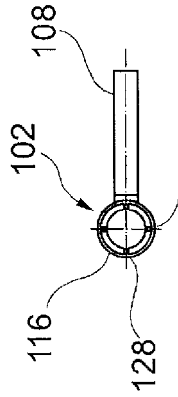
FIG. 13 shows a top view of a spring contact of the internal conductor of FIG. 12, according to an exemplary embodiment of the present invention.

FIG. 13 shows a top view of the spring contact 116 of the internal conductor 102. This illustration also shows the angled partial region 108 of the internal conductor 102. The top view of the spring contact 116 shows the four slots 128 that ensure the spring action of the spring contact.

Figure 14:
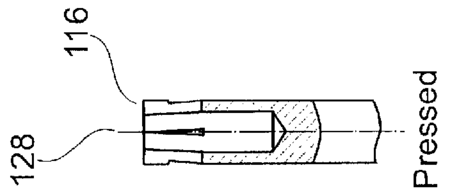
FIG. 14 shows an enlarged section of the spring contact of the internal conductor of FIG. 12, according to an exemplary embodiment of the present invention.

In FIG. 14 the spring contact 116 is shown in its pressed shape. The term “pressed shape” denotes that the end regions of the slot 128 are pressed together.

Figure 15:
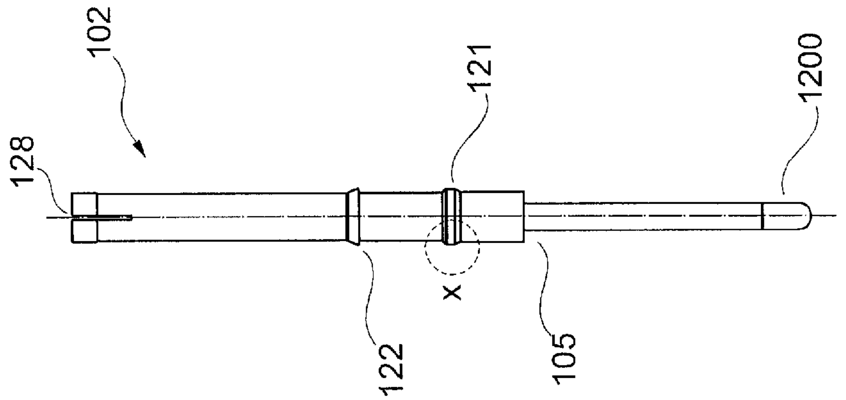
FIG. 15 shows a lateral view of the internal conductor of FIG. 12, according to an exemplary embodiment of the present invention.

FIG. 15 shows a further view of the internal conductor 102, wherein in the view of FIG. 15 the direction of view is towards the bend 1200. Since the internal conductor 102 is essentially symmetrical in design, the hook element 122, the gap 128 and the elevation 121, as well as the point of discontinuity 105, are also shown.

Figure 16:
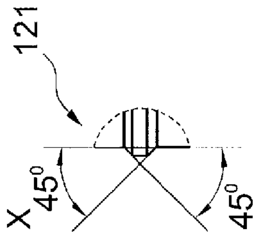
FIG. 16 shows a section of the lateral view of the internal conductor of FIG. 15, according to an exemplary embodiment of the present invention.

FIG. 16 shows a detailed view of the shape of the elevation 121.

Figure 17:
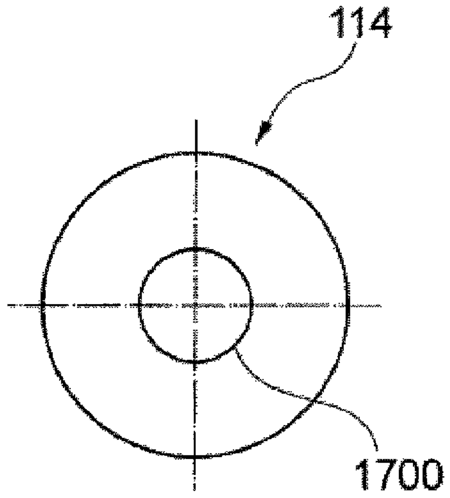
FIG. 17 shows a Teflon disc according to an exemplary embodiment of the present invention.

FIG. 17 shows a top view of the Teflon disc 114 which constitutes the first separation device 114. The diagram shows the concentric design of the Teflon disc 114. In other words this means that the disc 114 comprises a circular hole 1700, wherein the internal conductor 102 can be guided through this hole. In this arrangement, by means of a press fit between the edge region of the hole 1700 and the internal conductor 102, a firm seat can be established. In order to produce the press fit, the diameter of the hole 1700 is somewhat smaller than the diameter of the internal conductor in the region between the point of discontinuity 105 and the end region 103 of the conductor leadthrough, which end region 103 comprises the spring contact 116.

Figure 18:
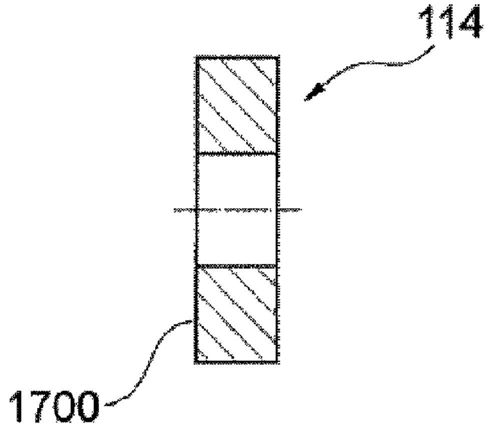
FIG. 18 shows a section view of the Teflon disc of FIG. 17, according to an exemplary embodiment of the present invention.

FIG. 18 shows a section view of the Teflon disc 114 according to FIG. 17. The external diameter of the Teflon disc 114 is selected so that together with an internal region of the external conductor 101 of the conductor leadthrough 100 (not shown in FIG. 18) it forms a press seat or a press fit.

Figure 19:
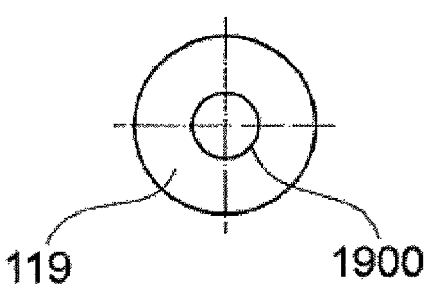
FIG. 19 shows a top view of a socket according to an exemplary embodiment of the present invention.

FIG. 19 shows the concentric socket 119. The socket 119 comprises the hole 1900, wherein the internal conductor 102 can be inserted through the hole 1900. The selection of the diameter of the hole 1900 is so that said socket 119 establishes a press fit with the internal conductor 102.

Figure 20:
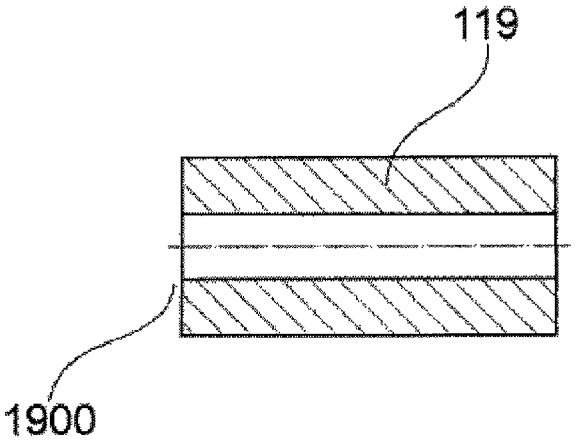
FIG. 20 shows a cross section of the socket of FIG. 19, according to an exemplary embodiment of the present invention.

FIG. 20 shows a cross section of the socket 119. FIG. 20 shows a rectangular cross section of the socket 119 because the socket is tubular in design.

Figure 21:
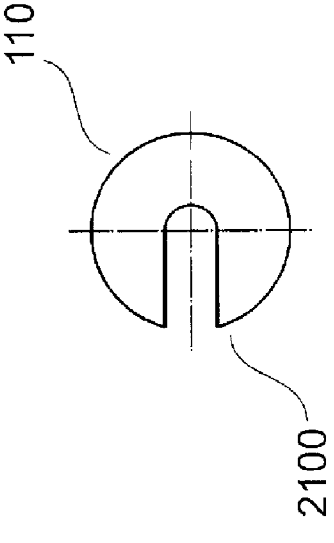
FIG. 21 shows a first support device according to an exemplary embodiment of the present invention.

FIG. 21 shows a top view of the insulating support 110. The insulating support 110 comprises a circular design with a U-shaped section 2100, wherein the U-shaped section is adapted to receive the internal conductor 102 in a kinked section 108 so that the insulating support 110 can ensure that the angled part 108 of the internal conductor 102 is spaced apart from an external conductor 101.

Figure 22:
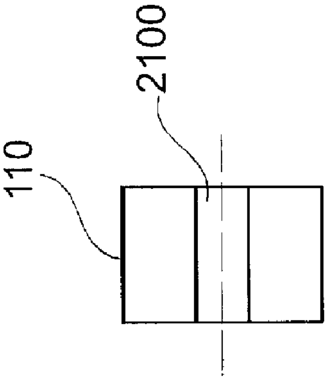
FIG. 22 shows a lateral view of the support device of FIG. 21, according to an exemplary embodiment of the present invention.

FIG. 22 shows a top view of the U-shaped section 2100 of the insulating support 110.

Figure 23:
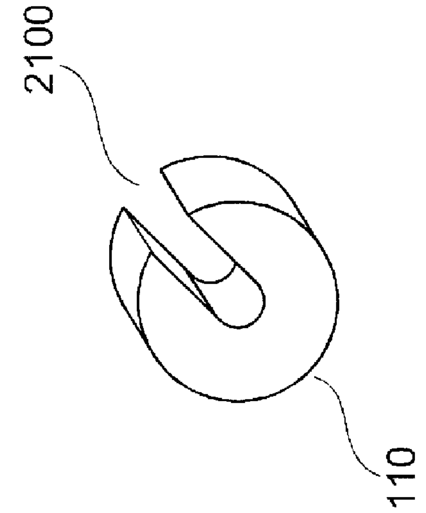
FIG. 23 shows a perspective view of a first support device of FIG. 21, according to an exemplary embodiment of the present invention.

FIG. 23 shows a perspective view of the insulating support 110, including the U-shaped incision 2100.

Figure 24:
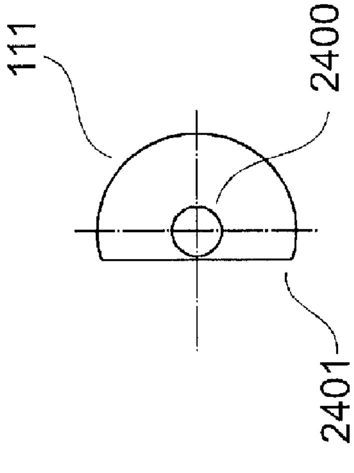
FIG. 24 shows a second support device according to an exemplary embodiment of the present invention.

FIG. 24 shows a top view of the insulating ring 111. The insulating ring 111 comprises a disc-shaped design, wherein a section of the insulation is cut off along a chord outside a centre hole 2400 so that a flat support surface 2401 arises. The support surface 2401 makes possible a secure hold on the printed circuit board 400 and ensures insulation from a printed circuit board 400. The diameter of the opening 2400 is dimensioned so that the internal conductor in the region of the angle 108 fits through the opening 2400.

Figure 25:
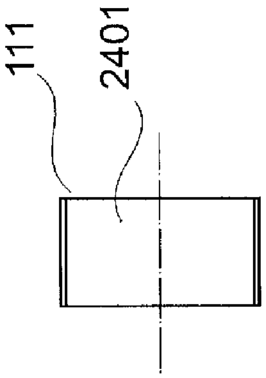
FIG. 25 shows a lateral view of the second support device of FIG. 24, according to an exemplary embodiment of the present invention.

FIG. 25 shows a top view of the flattened side 2401 of the insulating ring 111. The flattened side 2401, together with the flattened side 109 of the external conductor, comprises a flat surface that can rest against a printed circuit board 400.

Figure 26:
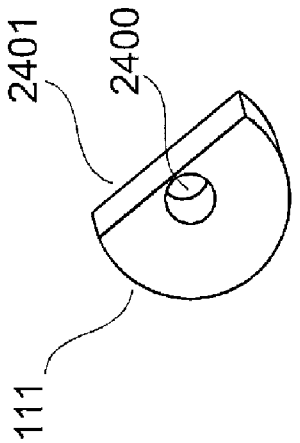
FIG. 26 shows a perspective view of the second support device of FIG. 24, according to an exemplary embodiment of the present invention.

FIG. 26 shows a perspective view of the insulating ring 111, wherein the diagram shows that the flat area 2401 is situated outside the hole 2400.

FIG. 27 shows a housing apparatus 2700 with an attachment device 2709, wherein the housing apparatus 2700 comprises a conductor leadthrough 100. The conductor leadthrough 100 or plug-type connection 100 connects a connection space region 2708 of the housing apparatus to an electronics space region 2703 of the housing apparatus 2700. The electronics space region 2703 is delimited by the wall 2704, while the connection space region 2708 is delimited by the wall region 2705.

The electronics space region 2703 and the connection space region 2708 are separated from each other by means of the separation apparatus 2706. The separation apparatus 2706 prevents, for example, a gas or material that is present in the connection region 2708 and that, for example, is highly pressurised from reaching the electronics space region 2703 and from establishing contact with an electronics arrangement that is not intrinsically safe, for example with the printed circuit board 400.

In order to convey signals, in particular electrical signals such as measured values or energy, from the connection space region 2708 to the electronics space region 2703, the conductor leadthrough 100 is provided, which is equipped to transmit the signals but essentially to prevent material from finding its way from the connection region 2708 to the electronics space region 2703.

The delimitation wall 2704 forms an electronics cup 2704. The electronics cup 2704 can comprise metal or plastic. Since the connection region 2708, in particular the socket region 120 of the conductor leadthrough 100, is provided for the connection of high-frequency signals, the HF housing 2707 is arranged in the electronics cup 2704. The IF housing 2707 comprises metal and is used to provide a shield against interference. Furthermore, the HF housing 2707 renders the housing 2700 EMC-safe (electromagnetic compatibility). The HF housing 2707 is used to provide a shield against interference signals that arise in the connection region 2708; said HF housing 2707 also reduces interference effects in the opposite direction, which interference effects would act from the electronics space region 2703 to the connection space region 2708. The HF housing 2707 or the shielding device 2707 is shaped so that in conjunction with the printed circuit board 400 the hollow spaces 2701 form between the printed circuit board 400 and the HF housing 2707. The hollow spaces 2701 are air-filled and can prevent the microwave circuit or the strip conductor 401, which is arranged on the surface of the printed circuit board 400, from establishing contact with the pourable-sealing material 2702. If the microwave circuit 401 were to establish contact with the pourable-sealing material, the HF characteristics of the microwave circuit 401 might be altered. In its installed state the microwave circuit 401 is situated in the hollow space 2701, where it points in the direction of the HF housing 2707. As a result of this the microwave circuit establishes contact with air that is present in the hollow space 2701.

The pourable-sealing material 2702, for example comprising silicon, is provided to improve explosion protection. The pourable-sealing material 2702 encapsulates unnecessary hollow spaces.

The flange 402 of the conductor leadthrough 100 is in conductive contact with the HF housing 2707 and serves as a mass connection. The nut 2710 is used to affix the conductor leadthrough 100 in the housing apparatus.

Figure 28:
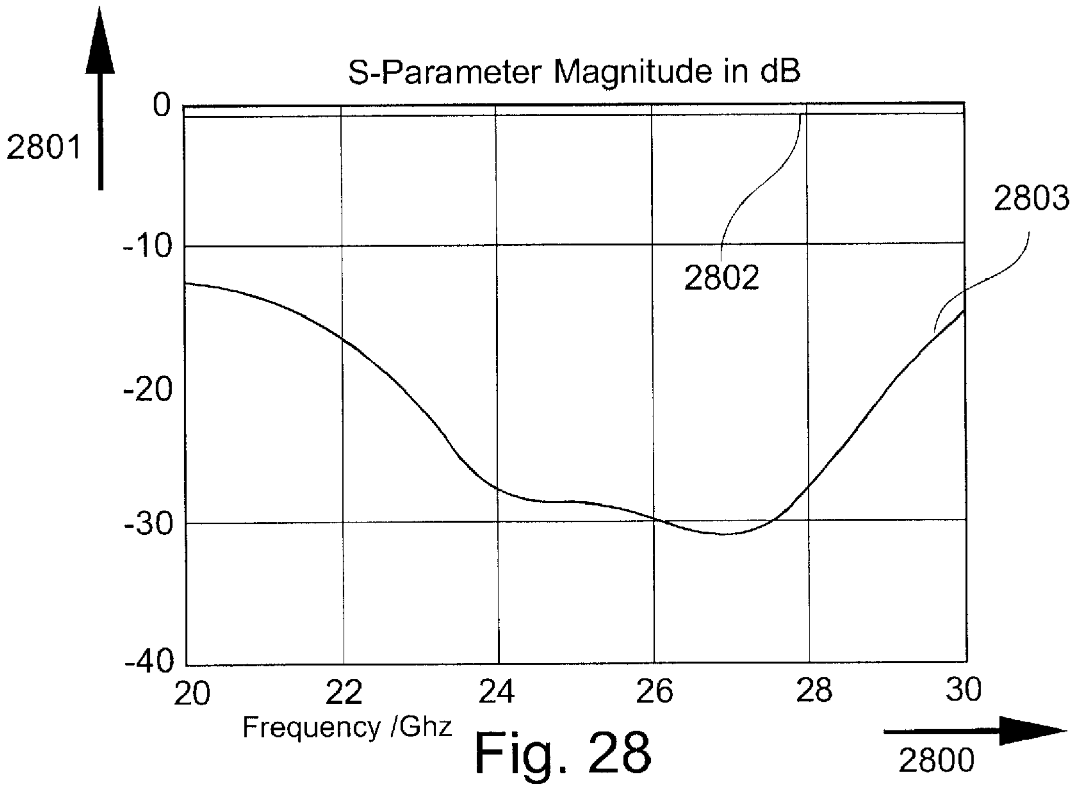
FIG. 28 shows a transmission attuation diagram and a reflection attuation diagram according to an exemplary embodiment of the present invention.

The diagram in FIG. 28 on the abscissa 2800 shows the frequency in GHz, spaced apart by 2 GHz in the 20 to 30 GHz range, and on the coordinate 2801 shows the S-parameter magnitude in dB. In this arrangement the curve 2802 shows the gradient of the transmission attenuation, i.e. the gradient of the S-parameter $S_{21}$. The diagram shows that the transmission loss ranges from 0.1 to 1 dB.

The curve 2803 shows the reflexion attenuation, i.e. the S-parameter $S_{11}$. The diagram shows that the reflexion attenuation in the 24 to 28 GHz range is approximately −30 dB.

The diagram shows that the proposed conductor leadthrough is suitable for leading electrical signals through a housing separation apparatus 2706. The signals range from 24 to 28 GHz, and thus the conductor leadthrough 100 is suitable for radar signals. The conductor leadthrough 100 can thus be used for transmitting measuring signals from the connection space region 2708 to the electronics space region 2703.

Figure 29:
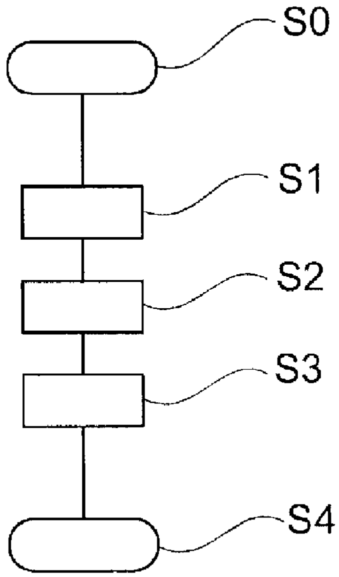
FIG. 29 shows a flow chart of a production method for a conductor leadthrough, according to an exemplary embodiment of the present invention.

FIG. 29 shows a flow chart of a production process for a conductor leadthrough 100. After initialisation of the method in step S0, in step S1 the external conductor 101 is provided. The external conductor 101 comprises a hollow internal region.

In step S2 the at least one first separation device 114 and/or the second separation device 119 are/is inserted into the hollow internal region so that a section of the hollow internal region between the at least one first separation device 114 and the second separation device 119 is separated. In particular, by means of the at least one separation device 114 the hollow internal region of the external conductor 101, 101' is divided into at least two sections.

In step S3 pourable-sealing device 117 is filled into at least one of the sections formed in step S2.

Figure 30:
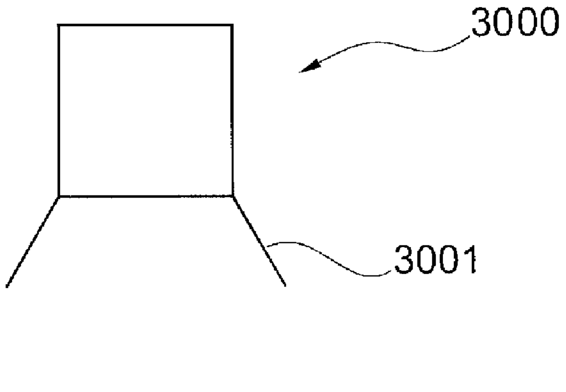
FIG. 30 shows a field device with a conductor leadthrough, according to an exemplary embodiment of the present invention.

FIG. 30 shows a field device. The field device 3000 comprises the measuring probe 3001. The measuring probe 3001 is electrically connected to the field device by way of a conductor leadthrough 100 (not shown in FIG. 30). The measuring probe 3001 can thus transmit the raw data measured by it to evaluation electronics in the field device 3000. The evaluation electronics are also not shown in FIG. 30.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A conductor leadthrough for a field device for connecting two electrical conductors, comprising:

an external conductor including a hollow internal region, the hollow internal region extending along a longitudinal axis of the external conductor; and a sealing apparatus including at least one first separation device, the at least one first separation device being arranged along the longitudinal axis so that it divides the hollow internal region into at least two sections;

wherein the external conductor also includes at least one hole forming a passage to the hollow internal region, wherein the at least one hole is positioned along the longitudinal axis so that a section of the hollow internal region, which section is separated by the at least one first separation device is accessible by way of the hole, so that a pourable-sealing device can be inserted into the section using the hole, and so that the at least one first separation device and the pourable-sealing device form the sealing apparatus, in order to seal off the hollow internal region, and wherein the conductor leadthrough is capable of transmitting an electrical signal along the longitudinal axis.

2. The conductor leadthrough according to claim 1, wherein the external conductor is assembled from several parts from a plurality of external conductor components so that in a disassembled state, the pourable-sealing device is accessible.

3. The conductor leadthrough according to claim 1, wherein the sealing apparatus further includes a second separation device, and wherein the at least one first separation device and the second separation device are spaced apart along the longitudinal axis so that the at least one first separation device and the second separation device separate a section of the hollow internal region.

4. The conductor leadthrough according to claim 3, wherein the at least one hole is positioned along the longitudinal axis so that a section of the hollow internal region, which section is separated by the at least one first separation device and the second separation device, is accessible by way of the hole so that the pourable-sealing device can be inserted into the section using the hole.

5. The conductor leadthrough according to claim 3, wherein the second separation device is designed as a socket.

6. The conductor leadthrough according to claim 1, further comprising:

a coaxial internal conductor arranged along the longitudinal axis in the hollow internal region, wherein the sealing apparatus is adapted to align the coaxial internal conductor in a central region of the hollow internal region.

7. The conductor leadthrough according to claim 6, wherein the coaxial internal conductor includes at least one spring contact.

8. The conductor leadthrough according to claim 6, wherein the coaxial internal conductor includes at least one bend which is designed to contact an electrical conductor.

9. The conductor leadthrough according to claim 6, further comprising:

a support device guiding the coaxial internal conductor.

10. The conductor leadthrough according to claim 1, wherein an internal diameter of the external conductor is determined as a function of dimensions of at least one of the at least one first separation device, the second separation device and the pourable-sealing device.

11. The conductor leadthrough according to claim 1, wherein at least one separation device is selected from the group of separation devices comprising the at least one first separation device and the second separation device, the at least one separation device being arranged, using a press seat, on an internal wall of the external conductor.

12. The conductor leadthrough according to claim 1, wherein the external conductor further includes an elevation extending from an internal surface of the external conductor into the hollow internal region and wherein the elevation extends into the hollow internal region so that the elevation, when the elevation establishes contact with at least one device, the elevation limits a movement of the sealing apparatus along the longitudinal axis, the at least one device being selected from a group of devices comprising the at least one first separation device, the second separation device and the pourable-sealing device.

13. The conductor leadthrough according to claim 1, wherein the external conductor is designed as a housing coupler.

14. The conductor leadthrough according to claim 1, wherein the at least one first separation device is designed as a disc.

15. The conductor leadthrough according to claim 1, wherein at least one separation device comprises Teflon, the at least one separation device being selected from a group of separation devices including the at least one first separation device and the second separation device.

16. The conductor leadthrough according to claim 1, wherein at least one end of the conductor leadthrough is designed as a standard high-frequency plug-type connector.

17. A housing apparatus, comprising:

a connection space region;

an electronics space region;

a housing separation device separating the connection space region from the electronics space region; and a conductor leadthrough including (a) an external conductor including a hollow internal region, the hollow internal region extending along a longitudinal axis of the external conductor; and (b) a sealing apparatus including at least one first separation device, the at least one first separation device being arranged along the longitudinal axis so that it divides the hollow internal region into at least two sections, wherein the external conductor further includes at least one hole forming a passage to the hollow internal region, wherein the at least one hole is positioned along the longitudinal axis so that a section of the hollow internal region, which section is separated by the at least one first separation device is accessible by way of the hole, so that a pourable-sealing device can be inserted into the section using the hole, and so that the at least one first separation device and the pourable-sealing device form the sealing apparatus, in order to seal off the hollow internal region, and wherein the conductor leadthrough is capable of transmitting an electrical signal along the longitudinal axis, wherein the conductor leadthrough is arranged in the housing separation device so that at least one of an electrical signal exchange and an electrical power exchange between the connection space region and the electronics space region becomes possible, and wherein the conductor leadthrough is further arranged in the housing separation device so that the connection space region and the electronics space region is sealed off from each other, by the sealing apparatus.

18. The housing apparatus according to claim 17, further comprising:

a printed circuit board being arranged in the electronics space region so that the printed circuit board can contact an internal conductor of the conductor leadthrough.

19. The housing apparatus according to claim 18, further comprising:

a shielding device shielding electromagnetic interference effects from the electronics space region, which interference effects act from a direction of the connection space region to the electronics space region.

20. The housing apparatus according to claim 19, wherein the shielding device spaces the printed circuit board apart from the housing separation device so that an air-filled hollow space is created between the printed circuit board and the housing separation device.

21. The housing apparatus according to claim 17, wherein the electronics space region comprises a pourable-sealing material.

22. A method for producing a conductor leadthrough which includes an external conductor and a sealing apparatus, comprising:

providing an external conductor which includes a hollow internal region;

inserting at least one first separation device of the sealing apparatus into the hollow internal region of the external conductor so that the hollow internal region is divided into at least two sections; and filling a pourable-sealing device of the sealing apparatus through at least one hole of the external conductor into at least one of the two sections of the hollow internal region so that the pourable-sealing device and the at least one first separation device form a sealing apparatus;

wherein the conductor leadthrough is capable of transmitting an electrical signal along the longitudinal axis.

23. The method according to claim 22, further comprising:

inserting a second separation device of the sealing apparatus into the hollow internal region so that the at least one first separation device and the second separation device are arranged so as to be spaced apart along the longitudinal axis and so that the at least one first separation device and the second separation device separate a section of the hollow internal region.

24. The method according to claim 22, further comprising:

turning an internal conductor;

slotting the internal conductor;

bending the internal conductor;

curing the internal conductor;

galvanising the internal conductor; and inserting the internal conductor into the external conductor so that, using at least one device, the internal conductor is aligned in an interior of the hollow space, the at least one device being selected from a group of devices including the at least one first separation device, the second separation device and the pourable-sealing device, wherein filling the section of the hollow internal region takes place after the insertion of the internal conductor.

25. A field device comprising:

a conductor leadthrough including (a) an external conductor including a hollow internal region, the hollow internal region extending along a longitudinal axis of the external conductor; and (b) a sealing apparatus including at least one first separation device, the at least one first separation device being arranged along the longitudinal axis so that it divides the hollow internal region into at least two sections, wherein the external conductor further includes at least one hole forming a passage to the hollow internal region, wherein the at least one hole is positioned along the longitudinal axis so that a section of the hollow internal region, which section is separated by the at least one first separation device is accessible by way of the hole, so that a pourable-sealing device can be inserted into the section using the hole, and so that the at least one first separation device and the pourable-sealing device form the sealing apparatus, in order to seal off the hollow internal region, and wherein the conductor leadthrough is capable of transmitting an electrical signal along the longitudinal axis.

26. The field device according to claim 25, wherein the field device is selected from the group of field devices comprising a fill-level measuring device, a flow meter, a radar measuring device or a measuring device based on the principle of a guided microwave.

* * * * *